United States Patent [19]

Clay et al.

[11] Patent Number: 4,791,622
[45] Date of Patent: Dec. 13, 1988

[54] OPTICAL DATA FORMAT EMPLOYING RESYNCHRONIZABLE DATA SECTORS

[75] Inventors: Donald W. Clay; Michael J. O'Keeffe; S. Robert Perera; Howard H. Rather, all of Boulder County; John P. Rundell, Adams County, all of Colo.

[73] Assignee: Storage Technology Partners 11, Louisville, Colo.

[21] Appl. No.: 75,273

[22] Filed: Jul. 20, 1987

Related U.S. Application Data

[60] Continuation of Ser. No. 794,212, Nov. 1, 1985, abandoned, Division of Ser. No. 534,037, Sep. 19, 1983, abandoned.

[51] Int. Cl.⁴ .............................................. G11B 20/12
[52] U.S. Cl. .......................................... 369/59; 369/48; 369/54; 369/58; 360/48; 360/27; 360/53; 360/371; 360/31
[58] Field of Search ...................... 369/59, 111, 47, 48, 369/54, 58; 360/48, 27, 53, 37.1, 31; 371/48

[56] References Cited

U.S. PATENT DOCUMENTS

| | | | |
|---|---|---|---|
| 4,022,986 | 5/1977 | Zees | 360/32 |
| 4,072,987 | 2/1978 | Walker | 360/48 |
| 4,222,072 | 9/1980 | Bailey | 360/32 |
| 4,375,101 | 2/1983 | Cerracchio | 360/53 |
| 4,389,681 | 6/1983 | Tanaka | 360/27 |
| 4,455,635 | 6/1984 | Dieterich | 369/59 |
| 4,464,714 | 8/1984 | Huijser | 360/40 |
| 4,571,716 | 2/1986 | Szerlip | 369/58 |

FOREIGN PATENT DOCUMENTS 2038058  7/1980  United Kingdom .................. 369/59

OTHER PUBLICATIONS

A Random Access System Adapted for the Optical Videodisc, by Mathieu, SMPTE Journal, Feb. 1977, vol. 86 No. 2, pp. 80-83.

"A Close Look at Digital Audio", by Rodgers, Popular Electronics Sep. 1979, pp. 39-44.

"A Long-Play Digital Audio Disk System", by Doi, Journal of Audio Engrg Soc., Dec. 1979, vol. 27, No. 12, pp. 975-981.

*Primary Examiner*—Alan Faber
*Attorney, Agent, or Firm*—Woodcock, Washburn Kurtz Mackiewicz & Norris

[57] ABSTRACT

An optical disk drive system with which data may be permanently and correctly stored on removable media. The system includes a drive into which the media, a disk housed in a cartridge, may be removably inserted. The drive interfaces with a host CPU through a storage control unit, which storage control unit may also have other peripheral devices, such as magnetic disk drives, coupled therethrough to the host CPU. A special data format is used for data stored on the disk in order to provide efficient use of and access to the available storage space. The disk is divided into data bands, each data band having a prescribed number of concentric data tracks therein. Each data track is divided into equal length sectors. The data is organized into data blocks, each block being made up of a selected sequence of prescribed data sections. Many of the data sections commence with synchronization bits followed by the data to be stored. The data of each data section is adapted to fit within each data sector on the disk. When data is written in any given sector, it is immediately checked for correctness by reading the data that has been written and comparing it with the data that was to have been written. Defectively written data is flagged so that it can be skipped over and ignored during subsequent reads. Data in a given sector is rewritten until it is written correctly.

9 Claims, 12 Drawing Sheets

OPTICAL DATA FORMAT EMPLOYING RESYNCHRONIZABLE DATA SECTORS

This is a continuation of application Ser. No. 794,212, filed 11/1/85, now abandoned, which is a division of Ser. No. 534,037, filed 9/19/83, now abandoned.

BACKGROUND OF THE INVENTION

This invention relates to optical data storage systems, and more particularly to a means for organizing data on an optical disk or platter of such a system in order to provide efficient handling, storing, detection, and processing of said data.

Over the past two decades or so, there have been two major trends in the data processing industry that have worked together to revolutionize the way that information is gathered, stored, and interpreted. The first trend has been the expansion of technological sophistication, as exemplified by the microcomputer chip. That is, computing power, which once required roomsful of equipment and kilowatts of electrical power to operate, can now be found in very small silicon chips. The second trend has been the cost of purchasing such computing power. Particularly in the area of memory—as costs have dropped and capacities have increased—there has been an inevitable rush to take advantage of the newfound memory space and fill it with information. In this respect, the demand for more memory and storage space has always seemed to outstretch the available supply of such memory space.

Unfortunately, for users with exceptionally large data storage needs, the magnetic-based storage peripheral devices adapted for use with high performance computers (i.e., magnetic tape and disk drives) have not been able to fill the need for more storage space. Traditionally, the need for more storage space in such large data storage systems has been addressed by merely adding additional magnetic disk drives and/or magnetic tape drives. This has been costly both in terms of expense (purchase/lease price plus maintenance costs) and floor space. Moreover, even though there have been some significant strides in recent years with respect to increasing the data storage capacity of these magnetic-based storage devices, the theoretical design limits of such systems are rapidly being approached. Hence, merely adding more magnetic disk or tape drives is no longer viewed as a practical alternative to the ever increasing need for storing more and more information. It is therefore apparent that a new type of data storage system is needed in order to handle the large amounts of data that information users need to store.

Optical technology—that is, the technology of using a laser beam to burn or otherwise mark very small holes on a suitable medium in a pattern representative of the data to be stored, which pattern can subsequently be read by monitoring a laser beam directed through or reflected off of the previously recorded marks—has been available in laboratories for some time. Unfortunately, however, such laboratory technology has not provided a cost effective alternative for use in data storage products. This is because the optical components have tended to occupy entire rooms and the power associated with operating the laser and associated components has been enormous. Further, such laboratory systems are not easily interfaced with existing high performance computer systems. That is, the techniques used to format and input the data have been totally incompatible with more conventional formatting and data processing techniques used in the magnetic-based storage systems. Moreover, the few optical storage systems that have been commercially introduced in the last few years have primarily related to the storing of video signals (image storing devices) as opposed to the storing of digital information. Further, the few digital optical storage devices that do not exist do represent a viable alternative or supplement to the existing peripheral magnetic-based storage devices for the user of large data bases of information.

A continuing problem that has existed with whatever type of data storage system is used is the problem of minimizing the errors that occur during read or write. The number of errors that occur in such a system is typically measured by a parameter referred to as the "bit error rate." This parameter is typically expressed as a number indicating the number of good bits of digital data that can be obtained for every bad bit of data that occurs. Thus, a bit error rate of 100,000 (10E+5) indicates that 100,000 bits of data can be read or played back before a bad or incorrect bit of data will be encountered. In order to provide a viable data storage system, bit error rates in excess of 10E+12 are generally required.

Numerous Error Correction codes (ECC) and similar error correcting schemes are shown in the art in order to improve the bit error rate of data processing systems. The very existence of such ECC schemes evidences the continuing and recurring problem of reducing errors that are introduced into such processing systems. Errors can principally originate from one of three sources: (1) in the write channel (i.e., the data is written incorrectly); (2) in the read channel (i.e., the data is read incorrectly); or (3) in the storage medium (i.e., even though the data is initially written correctly, the storage medium may change with time so as to alter the data to make it incorrect). Of these three potential sources of error, most known ECC schemes for use with peripheral data storage systems are directed only to correcting errors that occur in the read channel. Sources of error introduced by aging media, item (3) above, are minimized in magnetic-based storage devices by merely re-writing the data after a prescribed period of time. (This technique is commonly referred to as "refreshing.") That is, the old data is read, stored in a buffer memory, the media is erased, and new data is then written on the media in place of the old data. This refreshing technique is, of course, only available when erasable media is used. Optical media, on the otherhand, is generally not considered erasable because of the manner in which the marks are placed on the media by the laser beam. That is, once a hole or pit or other mark is burned or ablated on the media by the laser beam, it is difficult to remove that hole or pit or mark. However, over time, the media may "flow" or other changes may occur thereto so that the hole, pit, or other mark is somehow altered to the degree that light reflected therefrom might be incorrectly sensed.

A further challenge facing the user of large information systems is the manner in which the data stored is accessed. Certain types of data need only be accessed occasionally, and therefore the access time thereto is not critical. Other types of data are constantly on demand, and therefore must be accessed very rapidly if the system is to operate efficiently. Data bases that are only accessed sequentially or that only need to be accessed occasionally have been traditionally stored on magnetic tape. Data bases that must be accessed quickly, and usually in a random fashion, are stored on magnetic disks. (Access times are significantly faster with magnetic disks because the read/write head of the disk can radially move with respect to any area of the disk and quickly locate a data set within one or two revolutions of the disk.)

An important factor in determining how fast a given data set can be accessed is the manner in which the data is formatted. Coupled with formatting the data is the need to properly index the same so that a desired set of data can be quickly located. The size of the index needed unfortunately grows as the amount of data stored increases. In magnetic-disk art, this has generally not been a major problem because all the magnetic disks are on-line at all times. Thus, one entire disk surface, or even several disks, can be dedicated to indexing information. However, in optical storage systems, it is desirable to have the optical disk removable from the disk drive, much as a record is removed from a phonograph. In this way, only enough drives required to access the data that is continually needed will have to be coupled to the host computer or CPU. Other data, less commonly used, may be stored on a disk and the disk may be physically removed and stored in a suitable location, just as magnetic tape is now removed and stored. Hence, by providing removable optical media, the advantages of both magnetic tape and disk storage systems may be realized. However, when such removable media is used, extreme care must be exercised in defining the formatting and indexing functions so as to preserve most of the data storage space for the storage of user data, not indexing and housekeeping data.

It is thus apparent that there is a need in the art for an optical storage system that not only meets the data capacity and density needs of the exploding data processing industry, but that is also compatible with existing and future high performance CPU systems. Preferably, such an optical storage system will supplement (rather than replace) existing magnetic-based storage systems. That is, a few magnetic disk drives and a few optical disk drives coupled to a main CPU should be able to handle all the existing and future data storage needs of the high information user, instead of the roomsful of magnetic disk and tape drives that such a user must now have installed. However, it is also apparent that there is a need in the art for an optical storage system that provides acceptable data bit error rates, at least on the order of no more than one bit error for every $10E+12$ bits of information. Also, the overall data access times must be compatible with the high speed, high performance computers that are presently available. The optical storage system herein disclosed is directed to satisfying these and other needs.

SUMMARY OF THE INVENTION

It is an object of the present invention to provide an optical storage system that can be connected to a host CPU via a storage director that may be shared with other peripheral devices, such as a magnetic disk drive.

It is another object of the present invention to provide a data organization scheme for use in such an optical storage system that allows for the efficient storage, handling, detection, and processing of data written to and read from a disk of such system.

It is a further object of the present invention to provide such an optical storage system that uses removable disk media which, when inserted into an optical disk drive, offers the advantages of random access storage such as are available with magnetic disks; and, when removed from the drive, offers the advantages of low cost sequential storage, such as are available with magnetic tape storage devices.

A further object of the invention is to provide an optical storage system that provides up to four gigabytes of user data to be permanently stored on a single disk for at least 10 years.

Another object of the present invention is to provide such an optical storage system wherein error detection and correction circuitry is used to insure an acceptable bit error rate.

Still a further object of the present invention is to provide an optical storage system wherein data access times are comparable with existing high speed magnetic disk storage devices, thereby allowing the optical storage system to be efficiently used with existing (as well as future) high performance CPU systems.

The above and other objects of the present invention are realized in an optical storage system that includes a platter or media upon which the data is written, and a drive into which the platter is inserted when it is desired to read or write data. A storage controller that provides the necessary interface between a host CPU and the optical disk drive, advantageously allows other (existing) types of peripheral storage devices to be used with the CPU along with the optical storage system. The host CPU initiates the request to read or write data to the optical drive.

The media or "platter" upon which the data is stored is physically housed in a cartridge when the platter is not mounted within the drive. The entire cartridge is inserted into the drive by the user when it is desired to read or write data therefrom or thereto. The drive automatically removes the platter from the cartridge and mounts it for rotation on a suitable spindle mechanism. The cartridge advantageously protects the platter when not in use and allows for the easy storage thereof. A suitable platter identification number is optically written onto the platter, as well as onto the cartridge by other visible means.

The data format on the platter includes bands, tracks, blocks, and sectors. The platter surface is divided into a prescribed number of concentric areas that are referred to as "bands." Each band contains a prescribed number of concentric data tracks therewithin upon which data may be written. Data is organized on each track in fixed length logical units referred to as "blocks." In the preferred embodiment, there may be short blocks (e.g., 128 users bytes) and long blocks (e.g., 7904 user bytes). (As is known to those skilled in the art, a byte is a set number of data bits, typically 8.) Each track is physically divided into a fixed number of equal length segments referred to as "sectors". The sector is the smallest unit of encoded information, and its boundaries are predefined by sector marks placed on the platter. User data is encoded and written to specified types of sectors when stored on the platter. Other types of sectors are used to identify media defects and incompletely written user data.

The optical drive includes means for automatically removing the platter from the cartridge and mounting the platter on a suitable spindle for rotation. Several servo systems provide the means for locating a specific area on the surface of the platter and for directing the appropriate read or write laser beams thereto. In order to provide the needed access time, the servo systems include a course and fine seek system whereby a given area of the platter will be reached quickly using the coarse seek function, such as locating a desired band, and thereafter the fine seek function can be used to locate a specific data track therein. Other servo systems provide the function of tracking a given data track, automatic focusing of the read and write laser beams, and spin control of the spin motor. A laser/optical unit includes three laser sources: a write laser which generates a beam that marks the platter surface; a read laser which generates a lower powered beam that reflects off the surface of the platter to detect marks recorded during a write operation and for subsequent read operations; and a coarse seek laser which means carriage position error. (The carriage moves in and out radially with respect to the platter as controlled by the coarse servo system in order to locate a desired band on the surface of the platter.) The laser/optical unit also includes the mirrors, lenses, prisms, and other optical components that are needed for generating and directing the write and read laser beams to and from the desired locations.

A read/write channel is also indicated within the optical drive. The channel modulates and controls the write laser beam in response to data signals received from the host CPU through the storage director. The read/write channel also amplifies, filters, and converts to digital form, the information received from the read laser beam reflections. A clock signal is also extracted from the read data. Appropriate error detection and correction circuitry is also included within the optical drive.

Advantageously, the storage controller used to communicate with the optical drive to and from the host CPU may be any conventional controller for use with existing peripheral disk storage products, modified with appropriate software or code. No hardware changes are required.

In accordance with one specific feature of the present invention, the optical storage drive employs Dynamic Defect Skipping (DDS) to eliminate data errors that occur during a write operation. When a data error occurs while writing to the optical platter, it is immediately detected by using a read back check beam, and the data in the error is then rewritten. Consequently, all data written to the platter is correct. Appropriate tags or flags are used to identify incorrectly written data so that such data is subsequently ignored during a read operation.

Advantageously, three of the data bands on each platter are set aside for housekeeping and maintenance functions. One band is reserved as an index band in order to keep track of where various logical records are stored. Another band is a table of contents and keeps a history of the records stored and their respective status on that particular platter. The third band is used for maintenance and test purposes and provides some reference signals, pre-written on the platter, which can be used during various maintenance operations of the drive.

In summary, the particular platter format and data organization scheme used with the present invention, coupled with the protective cartridge in which the removable platter is housed, and the dynamic defect skipping and other error detecting and correcting features included within the optical disk drive, all combine to provide a versatile, accurate, efficient alternative and/or supplement to existing magnetically based data storage peripheral devices.

BRIEF DESCRIPTION OF THE DRAWINGS

The above and other objects, features, and advantages of the present invention will be more apparent from the following more particular description thereof presented in conjunction with the following drawings, wherein.

DESCRIPTION OF THE PREFERRED EMBODIMENT

The following description is of the best presently contemplated mode of carrying out the invention. This description is not to be taken in a limiting sense but is made merely for the purpose for describing the general principles of the invention. The scope of the invention should be determined with reference to the appended claims.

Figure 1:
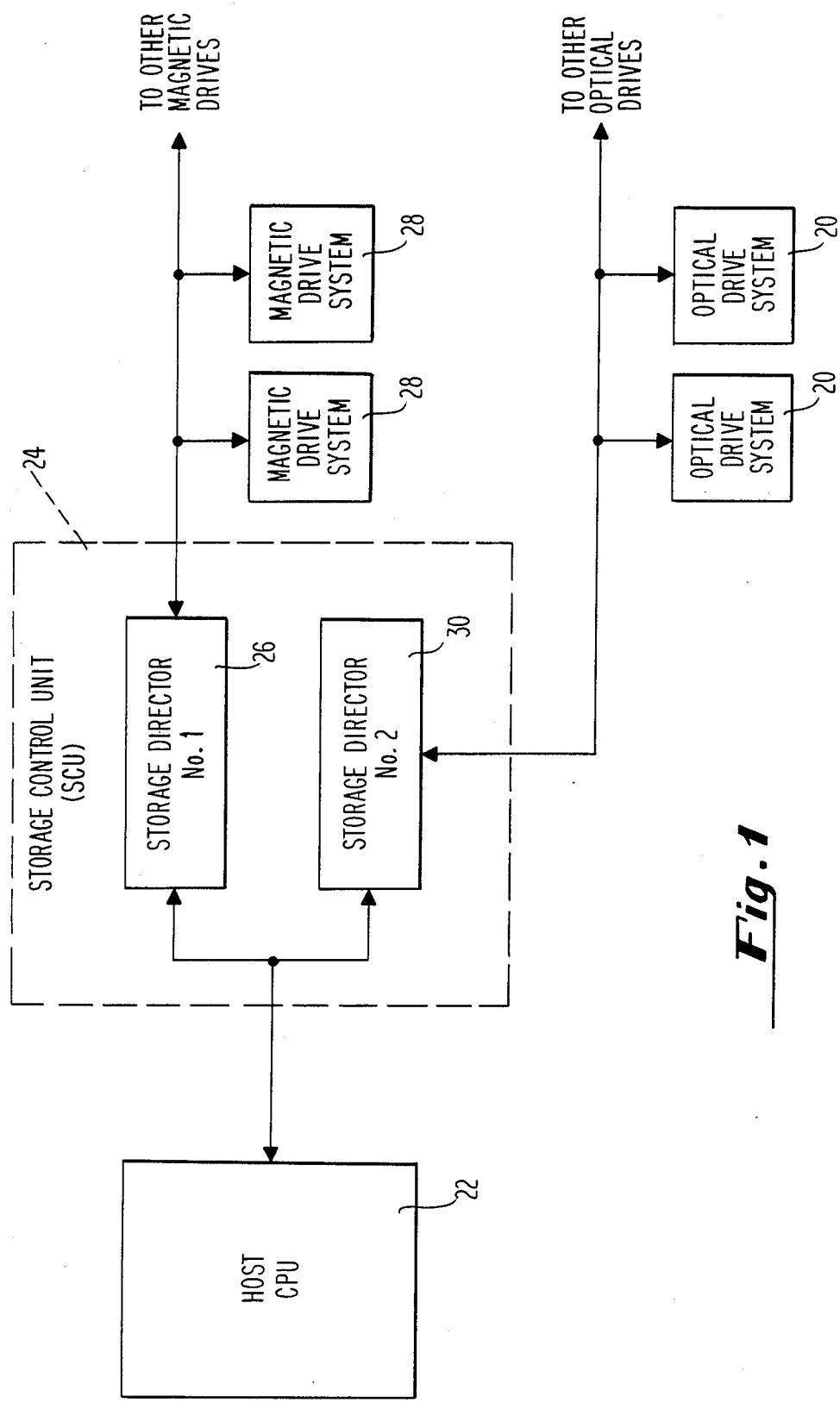
FIG. 1 is a block diagram illustrating how a plurality of optical drive systems may be coupled to a host CPU through a suitable control unit.

Referring to FIG. 1, an optical drive system 20 is adapted to be coupled to a host central processing unit (CPU) 22 via a storage control unit 24. Several optical drive systems 20 can be connected to the same control unit 24, if desired. Advantageously, in the preferred embodiment, the storage control unit 24 includes at least two storage directors. A first storage director 26 directs data to and from a plurality of magnetic drive systems 28. A second storage director 30 directs data to and from the optical drive systems 20. In this manner, both magnetic and optical storage devices may be coupled to the same host CPU 22 through the same storage control unit 24. This beneficial combination—of having both optical and magnetic storage devices coupled to the same host CPU through the same storage director—has not heretofore been commercially available to applicants' knowledge.

Advantageously, neither the host CPU 22 nor the storage control unit 24 need have hardware modifications made thereto in order to properly interact with the optical drive system 20. Depending upon the operating system employed within the CPU 22, a suitable interface program (software) will generally need to reside within the CPU in order to pass data to and from storage director 30. Similarly, appropriate software or firmware control within the storage control unit 24 will generally be used within the storage director 30 in order to provide the proper interface signals with the optical drive system 20. With these software modifications, conventional CPU's and storage control units may be employed with the optical drive system 20 of the present invention. The implementation details associated with the resident CPU software and the control unit software or firmware are not critical to the present invention. A representative data access method, implemented through the use of software resident within the CPU and storage control unit 24, is discussed in patent application OPTICAL STORAGE SYSTEM, Serial No. 533,521 filed concurrently herewith now abandoned, which application is assigned to the same assignee as is this application.

In a preferred configuration, the storage control unit 24 may be an 8880 controller, manufactured by Storage Technology Corporation of Louisville, Colo. Such a control unit optionally provides either two or four storage directors. Therefore, a large number of disk storage peripherial devices, either optical or magnetic, can be coupled therethrough to a host CPU 22.

Figure 2:
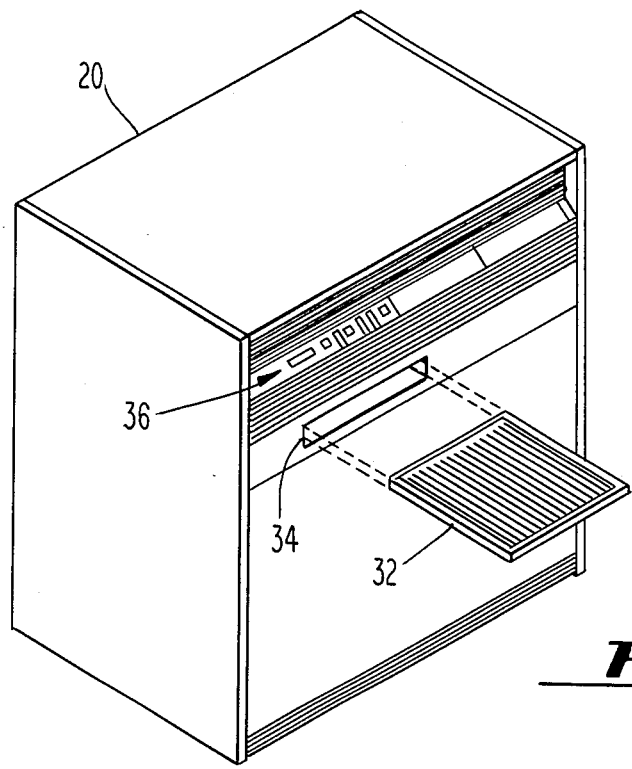
FIG. 2 is a perspective view of an optical drive system in accordance with the present invention, and shows how the platter cartridge is removably inserted thereinto.

Referring to FIG. 2, a perspective view of the optical drive system 20 of the present invention is shown. A cartridge 32, having the media therein upon which the data is optically stored, is adapted to be inserted into an opening or slot 34 along the front face of the drive system 20. Operator controls and indicators 36 are also conveniently located along the front of the unit 20.

Figure 3:
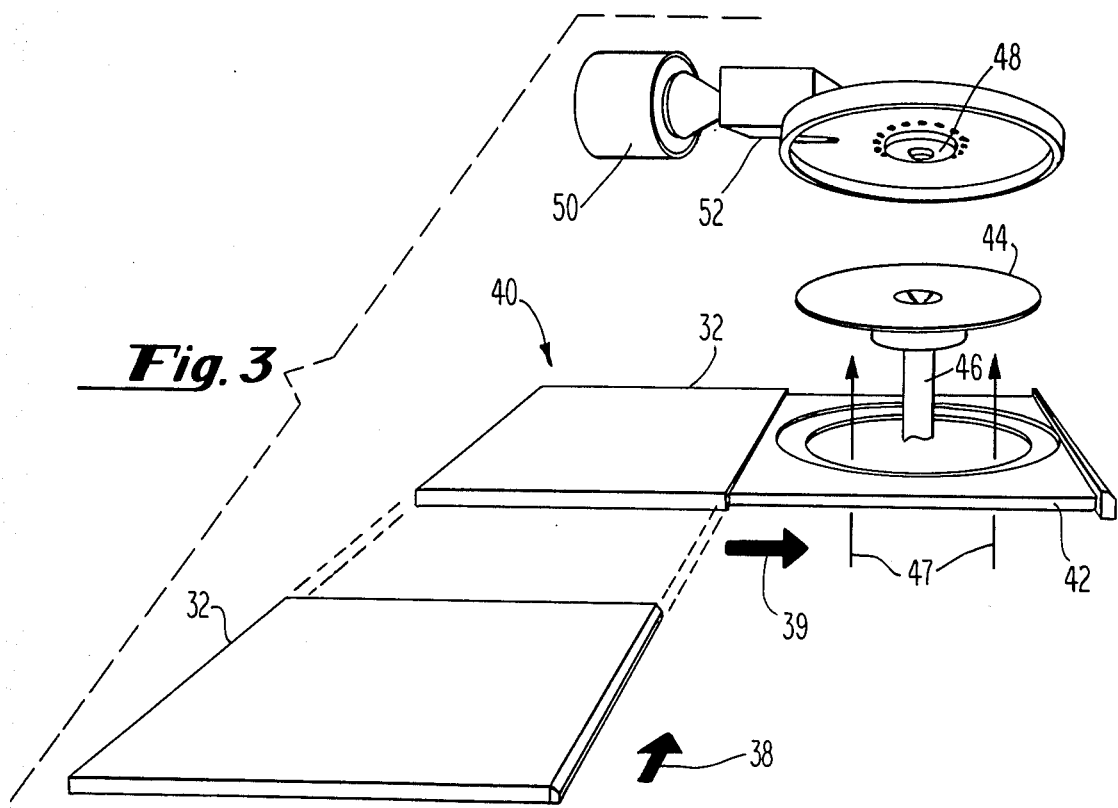
FIG. 3 is a mechanical schematic diagram illustrating how the platter is removed from the cartridge and mounted on a spindle of the optical drive system.

When a cartridge 32 is inserted into the drive 20, the media housed therein is removed from the cartridge as illustrated in FIG. 3. The cartridge 32 is pushed forward as indicated by the arrow 38 by the user. Once into the unit 20, at a position 40, the cartridge 32 is opened allowing a tray 42 holding the media or platter 44 to be slid out therefrom in the direction of the arrow 39. Once opened in this fashion, an elevator mechanism, schematically illustrated in FIG. 3 as a plunger 46, lifts the platter 44 away from the tray 42 in the direction indicated by the arrows 47. The platter 44 is then automatically centered and mounted on a spindle mechanism 48. An actuator 50 radially positions a read/write optical head 52 with respect to the mounted platter 44, thereby allowing access to a selected area on the surface thereof. Further details associated with the elevator mechanism 46 and the cartridge 32 may be found in copending patent application Ser. Nos. 499,750 and 499,669, filed May 31, 1983, and May 31, 1983, respectively, assigned to the same assignee as is the present application. Additional details associated with the manner in which the platter 44 is centered on the spindle 48 may be found in copending patent application Ser. Nos. 481,963 and 499,667, filed Apr. 4, 1983 and May 31, 1983, respectively, also assigned to the same assignee as is this application.

Figure 4:
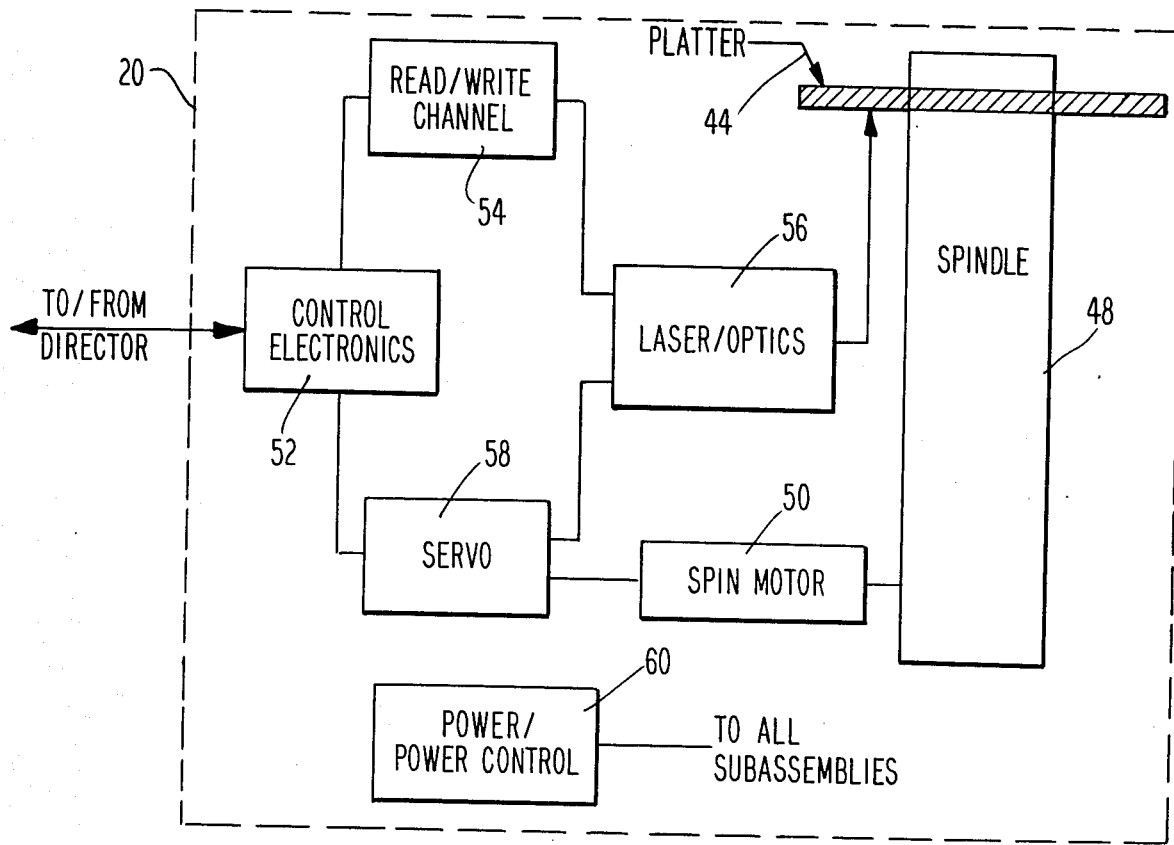
FIG. 4 is a block diagram of the optical drive system, and illustrates the principal elements used to read/write data from/to the platter.

Referring next to FIG. 4, a block diagram of the principle elements of the optical drive system 20 is shown. The platter 44 is mounted and centered on the spindle mechanism 48. A suitable spin motor 50 rotates the spinle 48, and hence the platter 44, at the desired rotational speed. Signals received from or sent to the storage director 30 (FIG. 1) pass through a control electronics section 52. The control electronics 52, as its name implies, provides the control necessary for communication with the storage control unit 24, including the interpretation of all commands received from the control unit 24. The control electronics 52, also, provide the necessary signals for controlling all of the hardware operations associated with the optical drive system 20.

A read/write channel 54 modulates a write laser diode in response to data signals received from the control electronics 52. The resulting modulated laser beam is directed through a laser/optics section 56 to the surface of the platter 34. Servo control for the spin motor 50 and the moving elements associated with the laser/optics 56 is provided by a servo system 58. The servo system 58 actually includes several servo systems, as will be apparent from the description that follows. A power/power control assembly 60 provides the AC/DC power required for the operation of the optical drive system 20. Primary power is secured from a suitable 50 or 60 Hz 3 phase power source.

Figure 5:
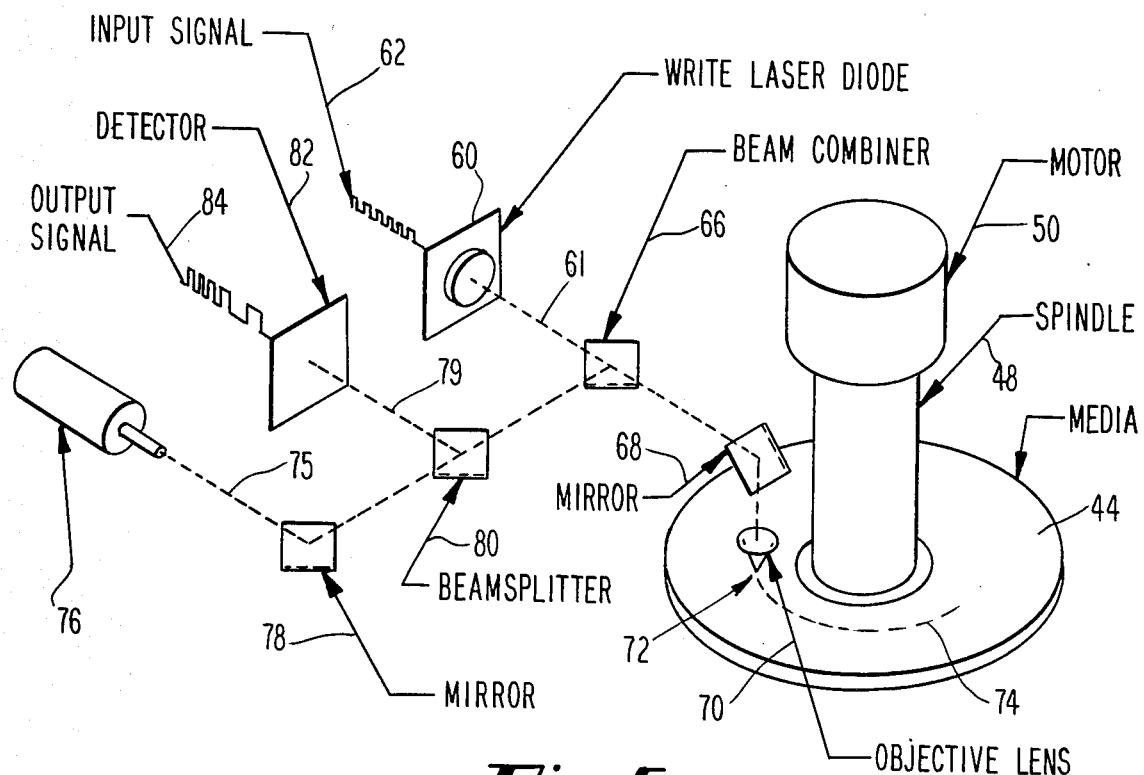
FIG. 5 is a simplified schematic depiction of the read/write process realized within the optical drive system.

In FIG. 5, a schematic representation of the read/write operation associated with the optical storage 20 is depicted. The platter 44, mounted and centered on the spindle mechanism 48, is spun by a spin motor 50. A write laser diode 60 is modulated by an input signal 62, which input signal represents the encoded binary digital data that is to be stored on the platter 44. A modulated laser beam 64, emitted from the write laser diode 60, is directed through a beam combiner 66, and is reflected from a suitable mirror or mirrors 68, through an objective lens 70 to a very small point 72 on the surface of the platter 44. Because the modulating signal is a binary (two level) signal, the modulated write beam is likewise a two level signal, having two power states associated therewith (typically "on" and "off" although any high and low power states will suffice). The write laser beam 64 has sufficient power associated with its on or high power state to permanently mark the surface of the media 44 at the point 72. Because the platter 44 is spinning or rotating, a track of data 74 is thereby formed on the surface of the media or platter 44.

Conceptually, access to a desired track on the surface of the platter 44 is achieved by radially positioning the mirror 68 with respect to the platter 44 so as to provide coarse access to a desired band (several tracks) on the surface of the platter 44. The mirror 68 is then controllably tilted about a desired access point in order to direct the laser beam to a desired track within the accessed band. Further details associated with the preferred embodiment of this type of servo system may be found in copending application Ser. No. 438,133 and 503,955, filed Nov. 1, 1982 and June 13, 1983, respectively, assigned to the same assignee as is this application.

During a read operation, a read laser beam 75 is generated from a suitable laser source 76. This beam 75 reflects off a mirror 78, passes through a beam splitter 80, reflects off the beam combiner 66, and reflects off the mirror 68 so as to pass through the objective lens 70 to the desired point 72 on the desired data track 74. This beam reflects off of the surface of the platter 44 and follows the same path back through the objective lens 70, the mirror 68, and the beam combiner 66 to the beam splitter 80. At the beam splitter 80, this reflected read beam 79 is directed to a suitable detector 82. The detector 82 generates an output signal 84 in response to the intensity of the reflected read signal 79, which reflected signal will vary in intensity according to the marks that have been placed on the media or platter 44 by the modulated write beam 64. In this manner, the binary input signal 62, stored as optically detectable marks on the surface of the platter 44 by the modulated write beam, may be subsequently retrieved therefrom. Advantageously, accelerated life tests indicate that data stored on the media or platter 44 will remain written thereon for as long as 10 years.

Figure 6A:
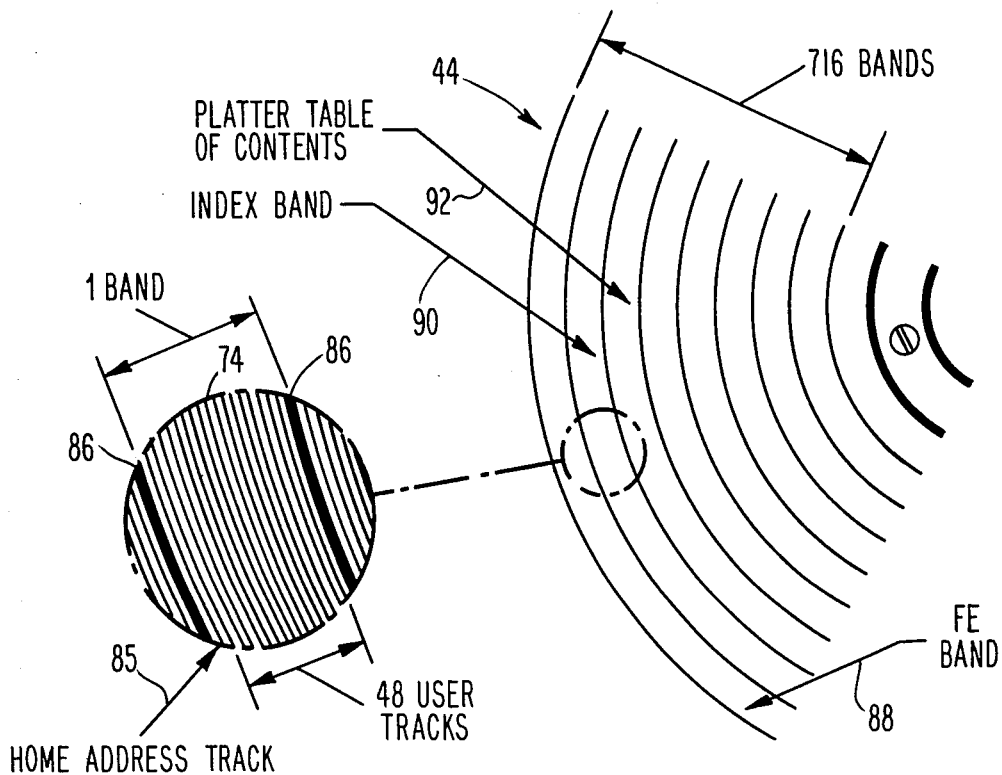
FIGS. 6a and 6b are representations of the data format and track organization, respectively, used on a platter in accordance with one embodiment of the present invention.

Referring next to FIG. 6a, a schematic representation of the format of the platter 44 is shown. The surface of the platter 44 is divided into a desired number of concentric bands, each band having a desired number of data tracks located therein. In the preferred embodiment, for example, up to 716 bands are included on each platter 44. Each band, as shown in the enlarged portion of FIG. 6a includes a desired number of data tracks. In the preferred embodiment, there are 49 data tracks in each band, one track 85 of which is designated as a home address track. The other 48 tracks are used to store desired data. The bands are physically separated by coarse servo tracks 86. These coarse servo tracks are used in conjunction with the servo system in order to position the optical read/write head 52 (FIG. 3) at the correct radial position of the platter 44. The use of coarse serve tracks in this manner is fully described in the previously cited copending applications, Ser. No. 438,133 and 503,955. Advantageously, sector boundary and clock information may be embedded in or otherwise derived from the coarse servo tracks.

As noted in FIG. 6a, a first data band 88 is set aside as a Field Engineering (FE) band. The FE band 88 contains data selectively placed in the tracks thereof during the manufacture of the platter 44. (That is, much of the data in the FE band is prewritten on the platter 44, including the servo tracks 86 and the home address track, during the manufacture of the platter.) The purpose of the data is the FE band is to allow the field engineer to test the reading functions of the optical drive system with data that is known to have been written correctly without having to demount the platter 44 currently on the drive being tested. Being able to test the read and other functions without demounting of the platter is useful in order to identify problems caused by decentering.

Also illustrated in FIG. 6a is a second band 90 designated as the Index Band. As its name implies, the Index Band is reserved for the index of the information stored on the platter 44. The index contains up to two entries for each band on the platter. The Index Band entries are written with "short" blocks of data. (The distinction between "short" and "long" blocks is discussed below.) Indexing data written in the Index Band provides a quick and efficient method for determining what data has been written on the platter 44.

A third band 92 on the platter 44 is reserved as the Platter Table Of Contents (PTOC). The PTOC band 92 contains data which describes the state of the platter. The entries in the PTOC band 92 are generally written with long blocks.

Figure 6B:
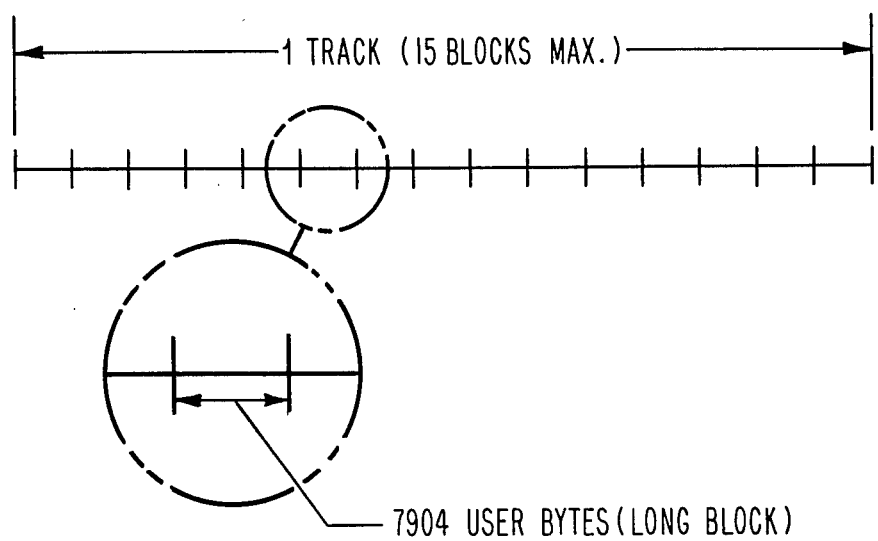

Data is organized on each track in fixed length logical units called blocks. One track may contain up to 15 long blocks, as symbolically illustrated in FIG. 6b. A logical data block is a byte sequence whose length is either 136 bytes (a short block) or 7912 bytes (a long block). Short blocks are used primarily for the Index Band 90. Long blocks are used for reading and writing user data, and are also used in the FE band 98 and the PTOC band 92. The maximum number of short blocks for a track is 222, and the maximum number of long blocks per track is 15. As will be explained hereinafter, the actual number of tracks may vary due to the number of defects encountered on the platter surface. Eight of the bytes contained within a short or long block are reserved as identification bytes. The remaining bytes are available for user data. Thus, there are 7904 user bytes in a long block, as indicated in FIG. 6b.

Each track is physically divided into a fixed number of equal length segments referred to as "sectors." The sector is the smallest unit of encoded information. User data is encoded and defined into various types of sectors in order to be written to the platter 44. Other types of sectors, as explained below, are used to identify media or platter defects and incompletely written user data.

When the encoded data is written on the platter, a read back check is employed in order to verify that the data has been correctly written. If a data error is detected, the sector is rewritten in such a way that during a normal read operation, the bad sector (the one containing the incorrect data) can be identified and ignored. In order to properly identify defective sectors, an additional sequence of sectors are thus appended to every logical data block prior to having it written on the platter. These additional sequence of sectors may be thought of as subsystem overhead sectors. The combination of the logical data block (the user data) and the subsystem overhead sectors is referred to as a physical data block. The total number of sectors which comprise a physical data block may vary due to the number of media defects encountered while writing the block of data to the platter.

Figure 7:
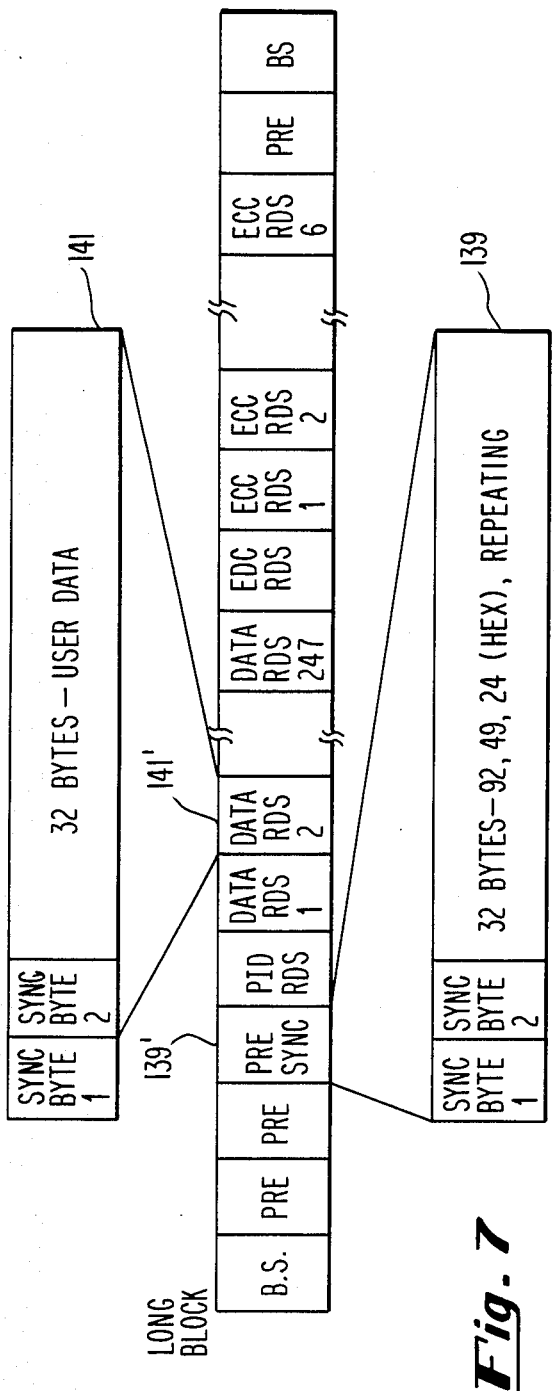
FIG. 7 is a diagram of the format used within a long block of data.

In the absence of detected errors, the physical data blocks recorded on a given track have a format as depicted in FIG. 7. This format may be described as a sequence of sectors in the following order:

1. A block separator sector.
2. Two preamble sectors.
3. One Preamble/Resynchronizable Data Sector (Pre/Resync Sector).
4. One sector containing a physical identifier or Physical I.D. (PID). The PID is an 8-byte number supplied by the control electronics 52 (FIG. 2) whenever data is written to the platter. This 8-byte number indicates the band number, track number, and relative record number within a band.
5. Two hundred forty seven (long block) or four (short block) resynchronizable data sectors containing 7904 (long block) or 128 (short block) bytes of user data. This user data may include a logical ID (LID) and a KEY as well as the user data. The LID is a 8-byte logical ID supplied by the access method of the host CPU 22. As such, the LID is a part of the user record and can be used as an address, and its use is a user option. The KEY is a string of data of up to 64 bytes that is appended to user data, if desired, by the host access method. As such, the KEY is also a part of the user record and can be used for addressing purposes if desired. LID's and KEY's are thus optional identifiers that may be used to further identify and locate a particular block of user data.

6. An error detection code resynchronizable data sector (34 bytes).

7. Six resynchronizable data sectors containing the error correction code for the data (204 bytes).

8. A Pre/Resync Sector.

9. A block separator sector.

From the above list, it is seen that a long block format (in the absence of detected errors) contains 261 total sectors, while a short block contains 18 total sectors. Those sectors identified in items 3-8 above are all resynchronizable sectors that have two sync bytes at the beginning thereof.

Subsequent blocks are written beginning in the sector immediately following the last block separator of the previously written data block.

In the preferred embodiment, the block separator sector has a 1.6 MHz square wave written therein. A preamble sector, in contrast, has an 8 MHz square wave written therein. As indicated in FIG. 7, the Preamble/Resynchronizable Data Sector, or Pre/Resync sector, comprises two SYNC BYTES followed by an 8 MHz square wave. (Advantageously, the 8 MHz square wave can be generated by 2-7 encoding 92, 49, 24 [hex] repeating data.)

The physical identifier, or PID sector shown in FIG. 7, is comprised of two SYNC BYTES followed by 32 bytes of 2-7 encoded data comprising two identical copies of a 16 byte group of data (hex) as follows:
FF
FF
FF
One's complement Track Number.
One's complement Band High.
One's complement Band Low.
One's complement Relative Block High.
One's complement Relative Block Low.
00
00
00
Track Number.
Band high.
Band low.
Relative Block High.
Relative Block Low.

As those skilled in the art will recognize, FF and 00 are hex numbers. Tracks are numbered consecutively from the outermost track of the band to the inner most track of a band. The bands are likewise numbered beginning from the outermost band to the innermost band on the platter. Similarly, the blocks of data within a given track are consecutively numbered. By including within the PID sector both the one's compliment and the number itself of the track, band, and block, a positive identification can therefore be made.

As further indicated in FIG. 7, the user data is located in Resynchronizable Data Sectors that comprise two SYNC BYTES followed by 32 bytes of encoded user data. (As explained hereinafter, a 2-7 code is used in the preferred embodiment.)

The Error Detection Code Resynchronizable Data Sector (EDC RDS) includes two SYNC BYTES followed by the bytes of 2-7 encoded data whose value is determined by a CRC computation of selected data sectors. For a short block, the CRC polonomial is $x^{16}+x^{15}+x^2+x+1$. The seed (initialization) pattern is "5D5D". Thirty bytes of 00 follow the EDC bytes to fill the resynchronizable data sector.

The error correction data, or error correction code (ECC), comprises two SYNC BYTES followed by 32 bytes of 2-7 encoded whose value is determined by an interleaved REED SOLOMON computation on the selected data sectors and on the EDC resynchronizable data sector.

The format associated with the home address track 85 (FIG. 6a) will now be discussed. This track, as its name implies, is used to identify the particular band within which the home address track lies. The data portion of the first block of the home address track has the following information pre-written therein:

1. A unique 8-byte platter serial number in EBCDIC.
2. The same unique 8-byte platter serial number in ADCII.
3. Two bytes of binary 0's (used to terminate the previous string).
4. The length of a long block (also pre-written in the FE band 88).
5. The length of a short block.
6. The number of long blocks per track.
7. The number of short blocks per track.
8. The number of tracks per band.
9. The location of the index band.
10. The location of the FE band 88.
11. The number of long blocks per band.
12. The number of short blocks per band.
13. The number of band per surface.
14. The length of the physical identifier (PID).
15. The number of recording surfaces per platter.
16. A media type code.
17. A platter format manufacturing change level number.

Additional information may also be included in the home address track, following the information given above, such as information used to identify the media manufacturing process or processes, information identifying the software or microcode that is used, a servo track writer ID number (a servo track writer is an apparatus used during the manufacturing process of the platter the pre-written information thereon, such as the coarse servo tracks 86), the time and date of manufacture, the media sensitivity, and similar information.

With the data stored on the platter formatted as described above, each block of data can be readily identified. Moreover, many of the sectors used within each block of data are resynchronizable. That is, they begin with two SYNC BYTES. Hence, a data detection scheme can lock on to those SYNC BYTES using phase lock techniques in order to ensure that the subsequent data is accurately detected. (Conventional phase lock and detection schemes may be used.) Advantageously, the two SYNC BYTES that precede every resynchronizable sector do not map into any user data, yet the 2-7 code constraints are maintained. The 2-7 code is so named because the encoded data has the characteristic that a "1" is separated by a minimum of two 0's and a maximum of seven 0's. The 2-7 code may be summarized as shown in Table 1.

TABLE 1

2-7 CODE

| DATA WORD | CODE WORD |
| --- | --- |
| 10 | 0100 |
| 010 | 100100 |
| 0010 | 00100100 |
| 11 | 1000 |
| 011 | 001000 |
| 0011 | 00001000 |
| 000 | 000100 |

Figure 8:
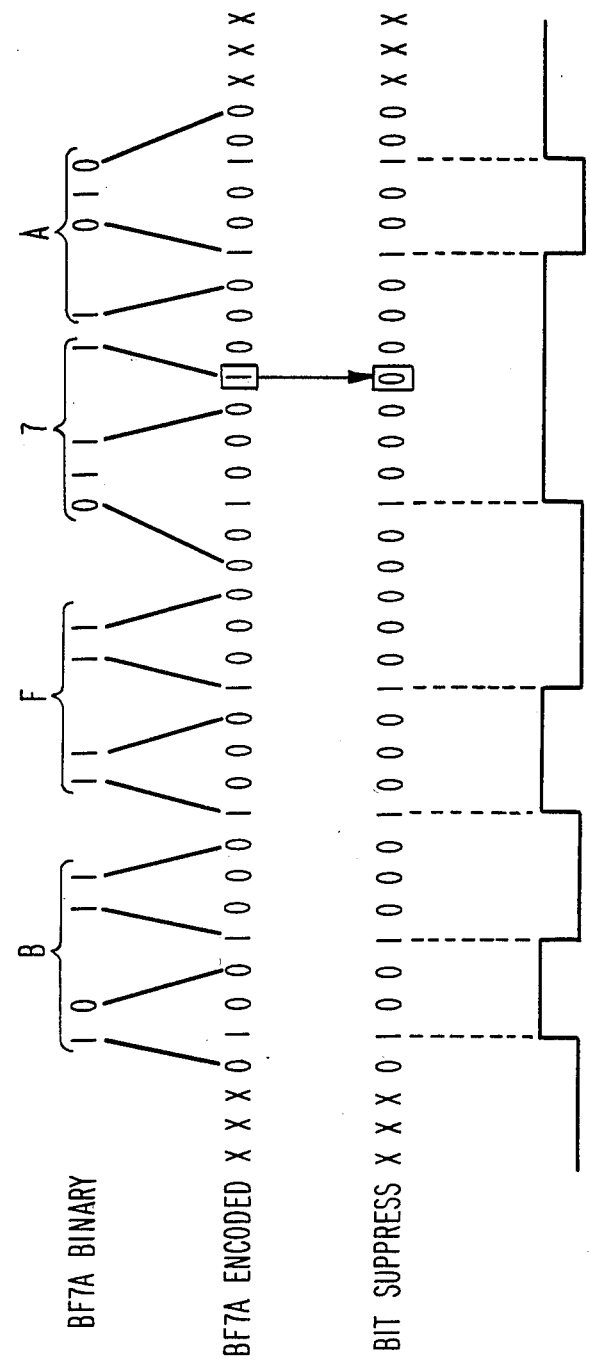
FIG. 8 is a bit diagram illustrating the generation of the sync bytes of FIG. 7.

The SYNC BYTES are used to establish a known bit position in the data stream. This position is required to allow the 2-7 decoding to begin at a code boundary in the bit stream and to determine the byte boundaries of the decoded data. The SYNC BYTES are located in the first two byte positions of the resynchronizable sectors as shown in FIG. 7. These resynchronizable sectors include the preamble preceding the physical identifier (PID), the PID, data, EDC, and ECC sectors of each data block. The SYNC blocks are defined by performing a 2-7 encoding of the word "BF7A" and modifying the result by changing a "1" to a "0" at the position indicated in FIG. 8. This modification advantageously prevents data from generating SYNC BYTES, but does not violate the 2-7 code rule as defined in Table 1.

Figure 9:
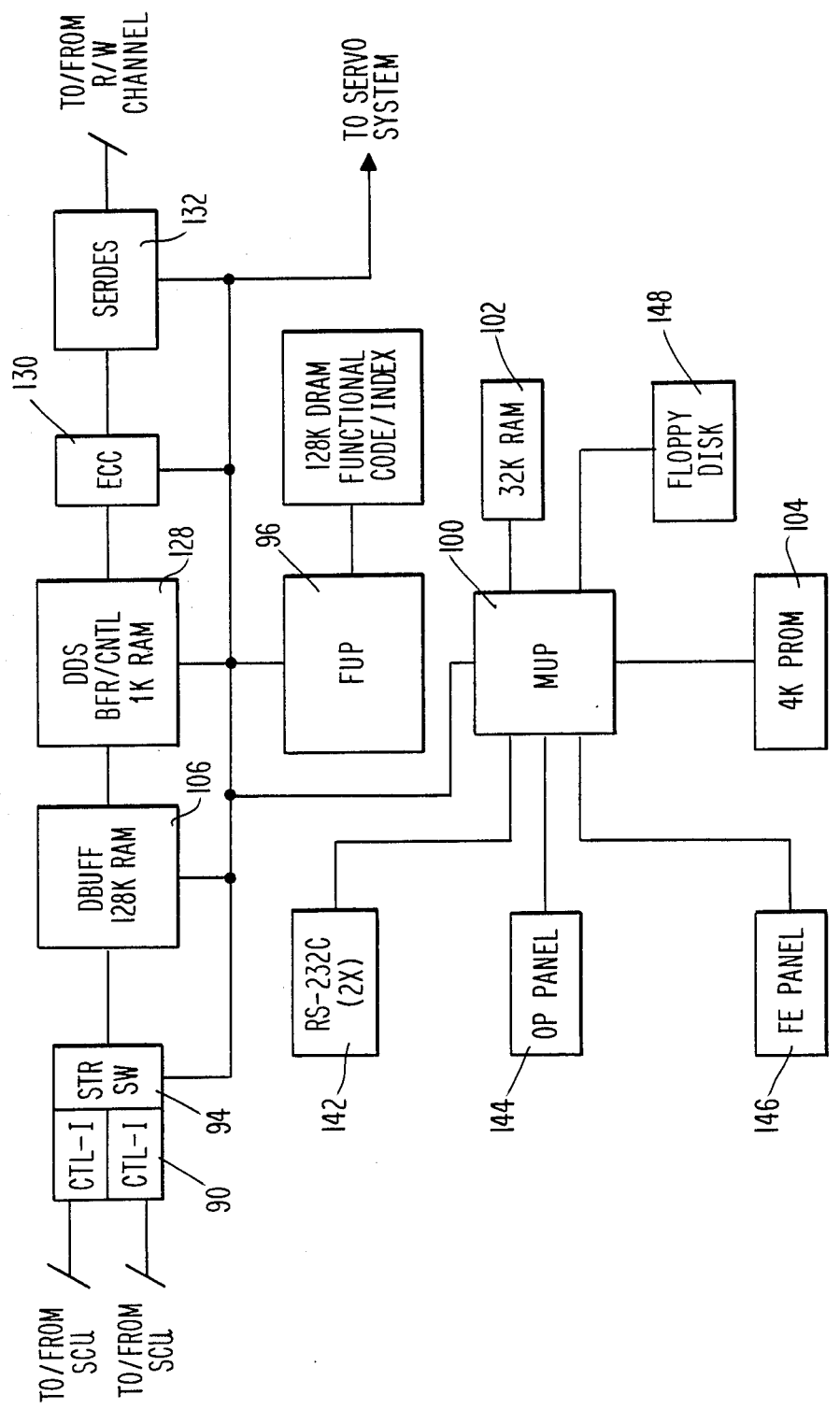
FIG. 9 is a block diagram of the control electronics of FIG. 4.

Referring next to FIG. 9, there is shown a block diagram of the control electronics 52 (FIG. 4) of the optical drive system 20. In the preferred embodiment, two control interfaces 90 and 92 are provided to enable communications with two separate storage directors of the storage control unit 24 (FIG. 1). Communication with two separate directors is provided to add flexibility to the particular configuration that will be used with the optical drive systems. A suitable switch 94 allows communication with either director to be selected.

A functional microprocessor 96 (FUP) performs the following functions within the optical drive system:

1. Hardware control.
2. Interpretation/execution of commands from the selected storage director.
3. Index buffer management.
4. Rapid band search (RBS).
5. Interrupt handling.
6. Status reporting.

Advantageously, this functional microprocessor 96 may be realized with a commercially available 16-bit processor chip, such as the MD 68000 manufactured by Motorola Semiconductor of Phoenix, Ariz.

Code for the microprocessor 96 may be stored in a suitable memory device 98, such as 128 K Dynamic Random-Access-Memory (DRAM). The DRAM 98 may also provide additional memory associated with the operation of the control electronics, such as index and other information.

A maintenance microprocessr (MUP) 100 is also used to provide the functions necessary for communications with and testing of the optical drive system 20. A 32K random access memory (RAM) 102 provides the necessary storage for the code associated with the maintenance microprocesssor 100. Advantageously, the maintenance processor 100 may be realized with an identical chip as is the functional microprocessor 96. A 4K read only memory (ROM), such as a programmable ROM (PROM) 104, is used to provide the Boot and start-up code for the MUP 100 and the other start-up functions associated with the control electronics 52.

Figure 10:
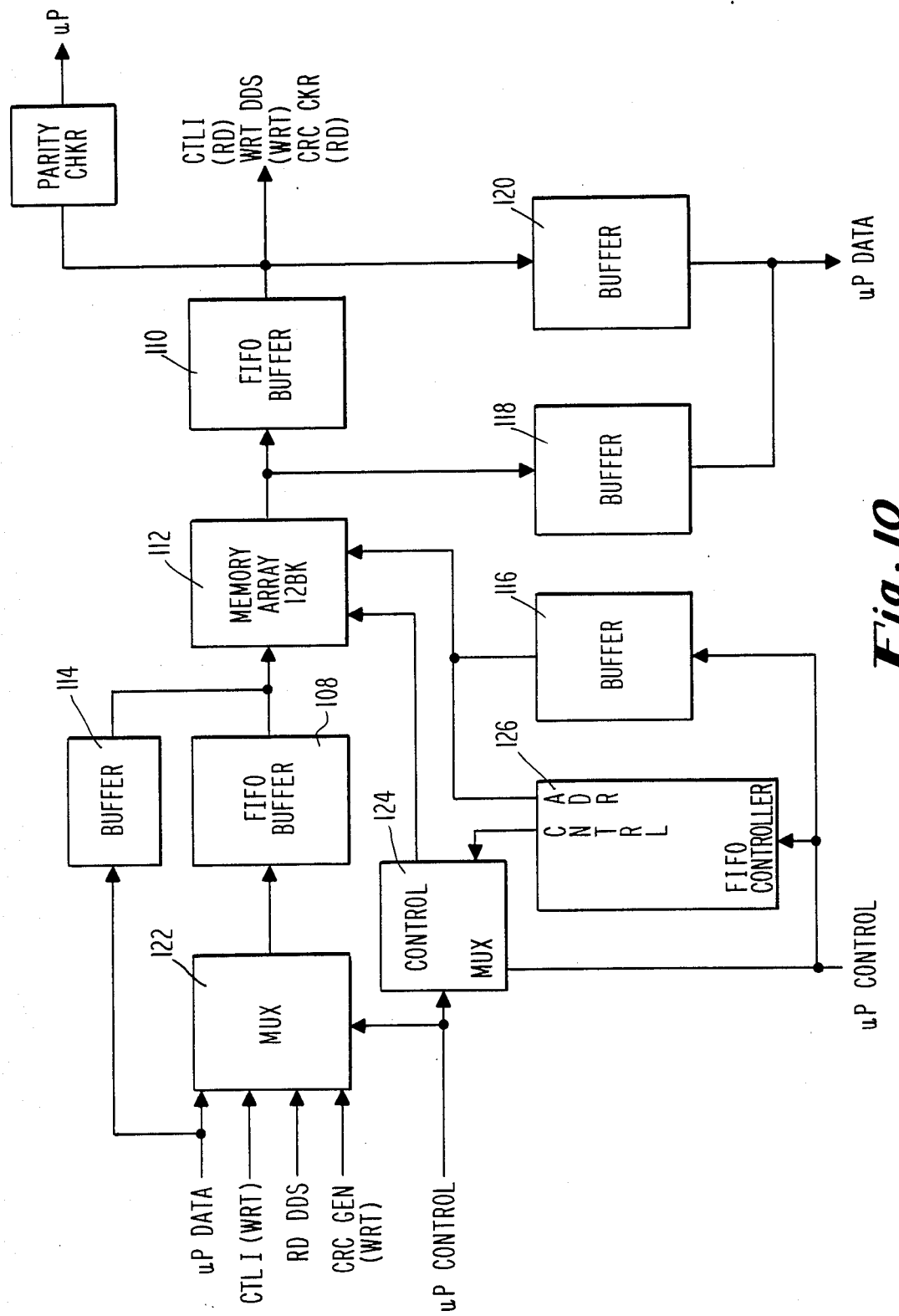
FIG. 10 is a block diagram of the data buffer (DBUF) of FIG. 9.
Figure 11:
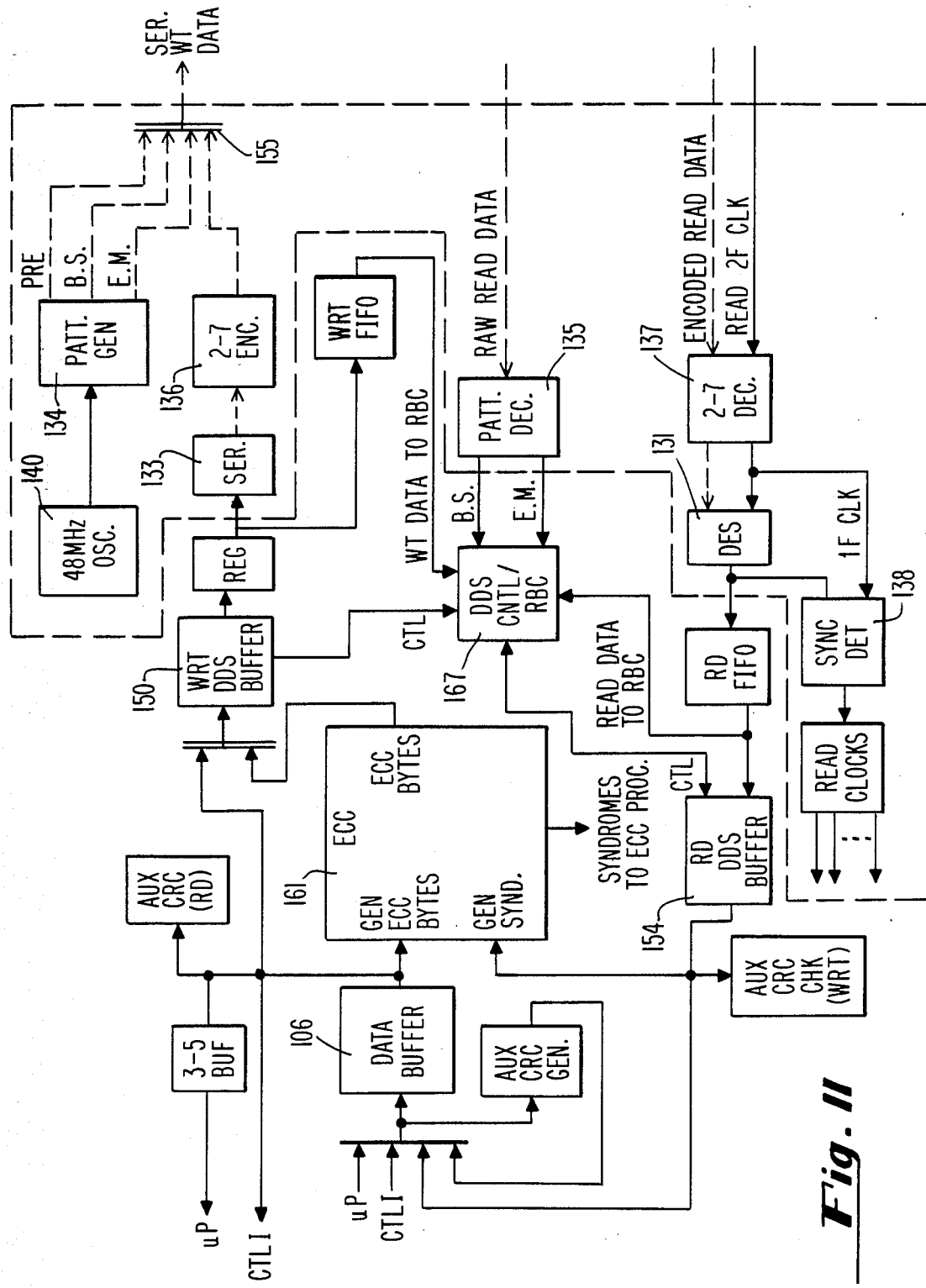
FIG. 11 is a block diagram illustrating the principle elements associated with the data path of the control electronics of FIG. 4.
Figure 12:
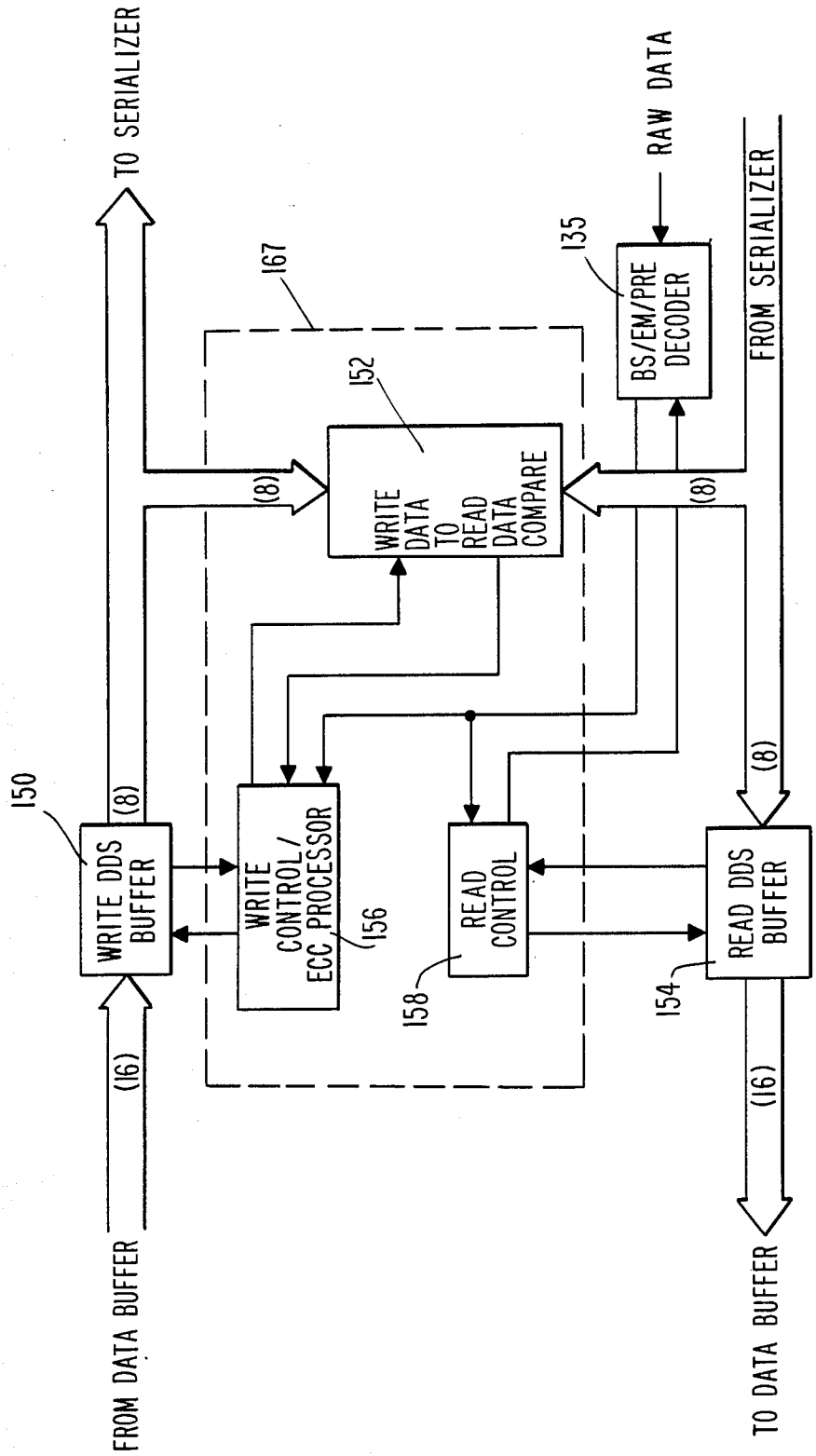
FIG. 12 is a block diagram illustrating the principal elements used to realize the dynamic defect skipping function.

A Data Buffer (DBUF) provides temporary storage of data transferred for read/write operations and compensates for the different accesss rates associated with the optical drive system. Thus, it is used for matching the speed of data transfer with the transfer rate of the host CPU 22. In the preferred embodiment, the DBUF 106 has a data capacity of one track, or 128 Kbytes. A block diagram of one possible embodiment of the data buffer 106 is shown in FIG. 10. Conventional circuitry may be used to realize functions indicated in each of the blocks of FIG. 10. Basically, the DBUF 106 includes two FIFO (First-In, First-Out) buffers 108 and 110 having a memory array 112 placed therebetween. Additional buffers 114, 116, 118, and 120 are used to help transfer data or control signals to and from the respective microprocessor 96 or 100. A multiplexer 122 selects the appropriate input data to be held within the DBUF 106. Control circuitry 124 generates necessary control signals for the memory array 112 and the multiplexer 122; and a FIFO controller 126, in response to control signals from the appropriate microprocessor, generates an address signal for the memory array 112.

Referring back to FIG. 9, a Dynamic Defect Skipping (DDS) buffer and control block 128 provides the necessary buffering for rewriting data after detected defects and to control read transmitted data during read. The Dynamic Defect Skip function is described more fully below in connection with FIGS. 11-14.

Suitable error correction code (ECC) circuitry 130 is employed in the data path to improve the data error rate during a read operation. As with all ECC schemes, this process involved properly encoding the data when it is written with a suitable code that when read back not only helps identify that an error has occurred but also provides the necessary information to correct the error in most cases. In the preferred embodiment, the error correction code that is used comprises a triple error correcting (255, 249) READ/SOLOMON code, interleaved to degree 32. Each of the 32 interleaves has 6 ECC bytes associated therewith for a total of 192 ECC bytes for each block of data. The location of the ECC bytes with in the block is as shown in FIG. 7. Advantageously, the code is capable of correcting three symbols (bytes) in error per interleave. Because of this interleaving, this yields a first correction capability of 96 bytes. The error of the code is designed to meet or exceed the criteria that no more than one uncorrectable error occur in 10E+13 bits transferred.

The circuitry used to encode and decode the error correction code is advantageously shared between the encoding and decoding processes. This circuitry is described and claimed in a copending patent application, SHARED ENCODER/DECODER CIRCUITS FOR USE WITH ERROR CORRECTING CODES ON AN OPTICAL DISK SYSTEM, Ser. No. 533,828, assigned to the same assignee as the present application, and filed concurrently herewith.

Referring again to FIG. 9, a serializer/deserializer (SERDES) circuit 132 is used to take byte-serial channel data and convert it into bit-serial data to be written on the platter and visa-versa. The SERDES 132 circuitry comprises the elements enclosed within the dotted line 132 of FIG. 11, which figure depicts the data path associated with the control electronics 52 (FIG. 4). As is evident from an examination of FIG. 11, the SERDES circuitry provides the desired encode/decode function. The translation from data to code words and back follows the pattern indicated in Table 1.

The decode function performed at block 137 (FIG. 11), takes as input the 2F clock signal (obtained from the coarse servo tracks as described in copending patent application Ser. No. 501,956, filed June 7, 1983, assigned to the same assignee as is this application, which application is incorporated herein by reference) and the detected data from the phase locked loop circuits and generates corresponding data bits. The decode function of the decoder 137 also provides eror checking to detect the presence of "11" "101", or "00000000" patterns in the coded data. These bit patterns violate the rules for a 2-7 code.

As will be explained hereafter, there are a number of special patterns which must be inserted into the serial encoded bit-stream for formatting and for defect skipping purposes. These patterns include block separators, exception marks, and special resync characters. Thus, pattern generation circuitry 134 (FIG. 11) provides these characters to the data stream at the output of the 2-7 encoder 136.

A synchronizer circuit 138 provides the means to detect the beginning of a Resynchronizable Data Section (RDS) by decoding the special 2-byte field at the start of every RDS. (An RDS is that sequence of data bytes, such as is shown at 139 and 141 of FIG. 7 that is written into a data sector, such as 139' or 141' of a block of data). The circuit 138 also provides the means to acquire phase-sync for the 2-7 decoder and bit-sync for the data path. A block diagram of the synchronizer 138 is shown in FIG. 16.

In the preferred embodiment, the 2F frequency used in the generation of encoded data is derived from a crystal oscillator 140 running at 48 MHz. Other clocks used in the data path are all derived from this frequency. The clocks are distributed throughout the control electronics 52 (FIG. 4) as a 1F clock signal (24 MHz) and as four 12 MHz clock signals, each derived from the 1F clock and offset from each other by 90°.

Referring back to FIG. 9, an RS-232 interface 142 is provided within the control electronics in order to allow communication with the optical drive system 20 through the use of any suitable diagnostic tool on either a local or remote basis. An operator panel 144 provides the controls and indicators necessary for operator use in completing a power up/down sequence, or in a load-/unload of a cartridge 32. An FE panel 146 provides to the field engineer a manner of controlling and monitoring the operation of the optical drive system 20 so that proper diagnostics and tests can be run. A floppy disk 148, preferably an 8-inch floppy disk, provides storage for the maintenance processor 100 microcode, diagnostic microcode, and error log information.

As mentioned previously, an important feature of the present invention is the ability to correctly write data on the platter during a write operation. Correctness on the data is assured by performing a read back check. That is, immediately after the data is written on the platter 44 it is read back therefrom. The data read back is compared with the data written to the platter and if any differences exist then the data has been incorrectly written and is so marked. This process is repeated as many times as is necessary (within reason) in order to insure the correctness of the written data. This process is referred to as Dynamic Defect Skipping (DDS) and is functionally illustrated in FIG. 12. The data to be written is loaded into a write buffer 150. From this buffer 150, the write data is made available to the serializer 133 and a comparator circuit 152. Data read from the platter immediately after it is written is likewise made available to the comparator circuit 152 and to a read buffer 154. If the compare function performed by the comparator circuit 152 indicates that the data read back is the same as the data written to the platter, then appropriate control signals are generated to allow the read data held in the read buffer 154 to be transferred to the data buffer 106. If, however, the comparison of the write data to the read data indicates that an error has occurred, then appropriate control signals are generated to flag that particular sector as containing incorrect information. Any subsequent attempts to read a sector so flagged will cause the data therein to be ignored (not made available to the data buffer).

The particular flag used to indicate whether a given data sector is good or not is referred to as an Exception Mark (EM). An Exception Mark is a 2.0 MHz square wave signal and is derived from the 48 MHz write clock, as are the preamble signal (an 8 MHz square wave) and the block separator (BS) signal (a 1.5 MHz square wave). As indicated previously (in FIG. 7) each block of data starts with a block separator sector followed by two preamble sectors. (A block separator sector is a sector having a block separator signal written therein. Similarly, a preamble sector is a sector having a preamble signal written therein. Thus, as a short hand notation, a sector is identified by the signal written therein, e.g., an exception mark or EM sector, an RDS sector, a BS sector, etc.) The phase lock loop circuits used to detect the data require that at least two sectors of preamble precede the data. If any sector in these initial three sectors—the block separator or two preamble sectors—is bad, then the sequence must be restarted. A defective data sector is marked by a preamble/exception mark sequence. That is, immediately following the detection of a defective data sector, the following sectors are written:

Preamble sector
Exception mark sector
Preamble sector
Preamble sector
Rre/Resync Sector
Rewrite of sector before defective sector
Rewrite of defective sector In the rare case of defects larger than a sector, additional preamble sectors are written (prior to the exception marks) until a good preamble sector is read back or until ten defective sectors are encountered. In the case of a good preamble sector after n defective sectors, n exception mark sectors are written to mark the length of the defect. If a defect exception mark is read back, an incomplete block sequence is written and the entire block is rewritten. In the case of 10 defective sectors, an incomplete block sequence is written and the entire block is rewritten. The reason for this limit is the limited size of the read defect skip buffer 154.

An incomplete block sequence is defined to be a consecutive sequence of an exception mark sector and a block separator sector. If any sector is determined to be bad, a sequence is restarted. If the end of the track occurs before the sequence can be written successfully, error recovery procedures must be invoked from the host CPU or the storage control unit in order to recognize that a block that has been written could not be completed and could not be marked incomplete because of the end of the track. If an incomplete sequence is due to the end of a track, the sectors following the incomplete block sequence are padded with preamble sectors.

For the special case of the defect in the first Resynchronizable Data Section, the rewrite begins with the defective block, not the block prior to the defect.

Decisions concerning correctness of sectors are made at the start of each sector. This means that only approximately the first ¾ of the prior sector has been checked. An error beyond this point is detected one sector later. Because the rewrite starts one sector prior to the defect, no failure in the defect skip mechanism will occur. This means that a defect growth is less than approximately ¾ of a sector.

The particular write methods or processes used in connection with Dynamic Defect Skipping are summarized in Tables 2 and 3. In these Tables, a preamble, separator, or exception mark sector is termed "defective" if it is determined to be of marginal quality such that it may become unreadable in the life of the media. In contrast, a resynchronizable data section (RDS) sector is termed "defective" if any bit is in error during the read back check. Any sector may be termed "defective" if the input signal conditioning phase lock loop circuits determine marginal data is read back.

TABLE 2

WRITE METHOD

1. If the track is not empty, go to 9.
2. If 200 sectors written attempting to write incomplete block sequence, go to 35.
3. Write Exception Mark sector.
4. If Exception Mark defective, go to 2.
5. If 200 sectors written attempting to write incomplete block sequence, go to 35.
6. Write Block Separator sector.
7. If Block Separator defective, go to 2.
8. Go to 12.
9. If track full, go to 34.
10. Write Block Separator sector.
11. If Block Separator defective, go to 9.
12. Set "rewrite defective sector only" flag.
13. If track full, go to 34.
14. Write Preamble sector.
15. If Preamble sector defective, go to 9.
16. If track full, go to 34.
17. Write Preamble Sector.
18. If Preamble sector defective, go to 9.
19. If track full, go to 34.
20. Write "sync field, 92H, 49H, 24H, . . . " sector.
21. If sync not acquired or Preamble not detected, go to 9.
22. If track full, go to 34.
23. Write Resynchronizable Data Section.
24. If Resynchronizable Data Section defective, go to 300.
25. Reset "rewrite defective sector only" flag.
26. If last Resynchronizable Data Section written is not last Resynchronizable Data Section in this block, go to 22.
27. If track full, go to 34.
28. Write Preamble sector.
29. If Preamble defective (actually testing end of prior RDS), go to 300.
30. If track full, go to 34.
31. Write Block Separator sector.
32. If Block Separator defective, go to 30.
33. Stop, block successfully written status.
34. Stop, unable to write block, track full status.
35. Stop, unable to write incomplete block sequence at start of track status.

TABLE 3

DEFECTIVE RESYNCHRONIZABLE DATA SECTION ENCOUNTERED

300. If track full, go to 334.
301. If defect has spanned 9 sectors, go to 326.
302. Write Preamble sector.
303. If Preamble sector devective, go to 300.
304. If track full, go to 334.
305. Write Exception Mark sector.
306. If Exception Mark sector defective, go to 326.

TABLE 3-continued

DEFECTIVE RESYNCHRONIZABLE DATA SECTION ENCOUNTERED

307. If number of Exception Mark sectors marking this defect is less than number of defective sectors, go to 304.
308. Write Preamble sector.
309. If track full, go to 334.
310. Write Preamble sector.
311. If Preamble sector defective, go to 326.
316. Write sync field, 92H, 49H, 24H, . . . sector.
317. If sync not acquired or Preamble not detected, go to 326.
318. If "rewrite defective sector only" flag set, go to 323.
319. Back up dat pointer two sectors.
320. Set "rewrite defective sector only" flag.
321. If rewriting last data RDS in block, go to 30.
322. Go to 23.
323. Back up data pointer 1 sector.
324. If rewriting last data RDS in block, go to 30.
325. Go to 23.
326. If track full, go to 334.
327. Write Preamble sector.
328. If Preamble defective, go to 326.
329. Write Exception Mark sector.
330. If track full, go to 334.
331. If Exception Mark sector defective, go to 329.
332. Write Block Separator sector.
333. If Block Separator sector defective and track not full, go to 329.
334. Stop, successful incomplete block status.

The function of the write data compared circuitry 152 (FIG. 12) is to locate defective areas on the platter or media 44, or to isolate and identify other conditions that may cause data to be defectively written, by performing a byte-by-byte compare of written and read back data. When a mismatch occurs, an indication is sent to the write control circuitry 156. This indicator initiates a defect mark sequence at the next resynchronizable data sector boundary. The requirements of the data compare circuitry 152 are that the write buffer 150 hold the data until the read back data is ready. Each read back data byte is latched as it is input into the read buffer 154. The data compare circuitry 152 performs a byte-to-byte comparison. The write control circuitry 156 is signaled when a mismatch occurs.

The primary function of the write DDS buffer 150 is to hold the data until the read back check function has determined that data need not be rewritten. The size of this buffer is determined by three factors:

1. The delay between the inputting of the data to the serializer and comparing the data read back to the written data. This time is estimated to be on the order of 2 Microseconds in the preferred embodiment.

2. The data buffer latency (e.g., how fast data can be retrieved from the buffer). Data buffer latency is considered to be negligible.

3. The DDS algorithms. The algorithm requires rewriting of the resynchronizable data sector before the resynchronizable data sector with the defect. Therefore two sectors must be buffered for this factor. In the preferred embodiment, consideration of these factors yields a total write DDS buffer size of three RDS's, or 96-bytes.

A read control section 158 (FIG. 12) supervises data block deformatting, including finding the start of the block and separating data RDS's from non-data RDS's and defective data RDS's. This control requires that several decisions and actions be taken within an RDS time. The requirements of the read control circuitry 158 may be summarized as:

1. To find the start of a data block;

2. To manage the read DDS buffer (full or empty);

3. To count the exception marks in order to determine a given defect size;

4. To adjust the read DDS buffer point for defect/reread;

5. To set/reset the phase lock loop control lines as required (high gain, filter unlock, etc.); and 6. To initialize the ECC syndrome generators at the start of each data block entering the data buffer.

The read control section 158 must exhibit flexibility in order to allow rapid changes to take place as unexpected read errors occur. A high speed microprocessor is the preferred means to achieve this flexibility. An 8×305 based design is a suitable microprocessor that may be used for this task because it is a complete single chip microprocessor that is commercially available from Signetics and it operates at the required speed. This is the same type of microprocessor, advantageously, that may be used to realize and control the ECC functions (block 130 in FIGS. 9 and 11).

The write control circuitry 156 (FIG. 12) controls the data block format, including the preamble, postamble, dynamic defect marking and rewrite, and incomplete block marking. As with the read control circuitry 158, the write control circuitry 156 requires that several decisions and actions be made within an RDS time. (An RDS time, in the preferred embodiment, is 11.3 microseconds). The requirements of the write control circuitry may be summarized as follows:

1. To control the stating and ending of data blocks;

2. To determine/control the writing of special RDS's (such as exception marks and block separators;

3. To manage and write the DDS buffer (full or empty);

4. To adjust the right DDS buffer pointer for defect or rewrite;

5. To resynchronize the data compare hardware after a defect;

6. To synchronize/reset the miscellaneous write path hardware at the start of each block; and 7. To monitor for end-of-track while writing.

Flexibility in the write control circuit is also important. Flexibility allows rapid changes to take place as unexpected problems occur. For this reason, the write control function in the preferred embodiment is controlled by a high speed microprocessor. Advantageously, the microprocessor used for this function may be the same microprocessor used to compute correction vectors and offsets during a read, which would otherwise be idle during writes. Input/output ports, the capability to run the microprocessor at byte rate, and additional control memory are the only conditions required to utilize the ECC microprocessor for this function. In the preferred embodiment, the ECC microprocessor is realized with an 8×305 based design which executes instructions in 200 ns. As indicated, the same microprocessor used to realize the read control circuitry 158 may be used for this function. A suitable commercially available from Signetics.

The read DDS buffer 154 serves the primary function of delaying data from entering the data buffer 106 until the read DDS microprocessor 158 can determine if the data has been rewritten because of a defect detected at write time. Hence, the read DDS buffer 154 must be approximately 374 bytes (11 RDS×34 bytes) in length. Because the data buffer sometimes cannot accept data (e.g., to analyze KEY information, or for error correction) additional buffering may be required. The time required for these functions is variable, but should be no more than 300 microseconds in the preferred embodiment. Thus, all of these factors indicate that a total buffer size of approximately 1300 bytes be used. When a defect/rewrite occurs, the read control 158 senses this fact, stops data ingating, adjusts the read DDS buffer write counter, and restarts the data transfer at the beginning of the rewritten data.

Figure 13:
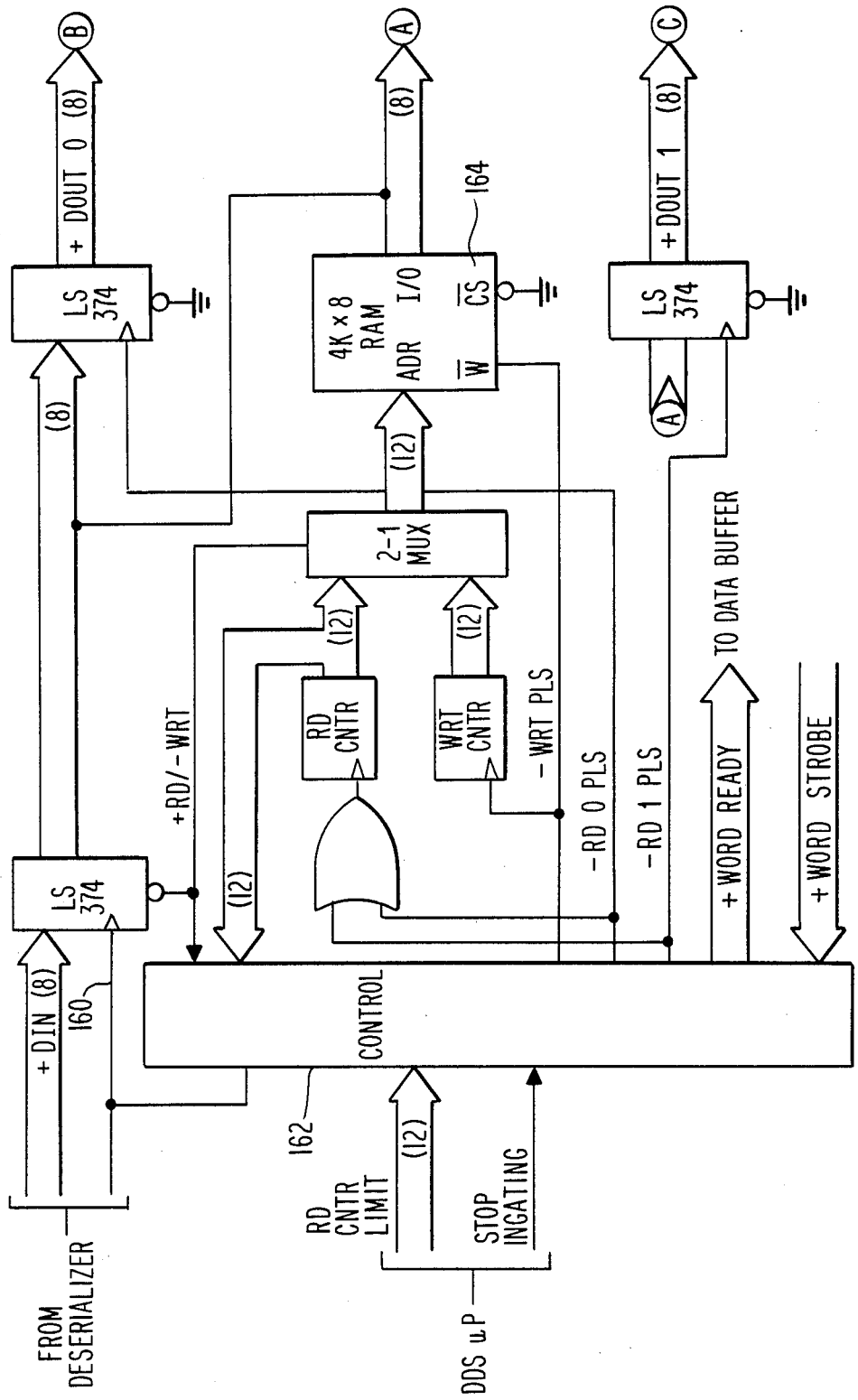
FIG. 13 is a block diagram of the read DDS buffer of FIG. 12.

The implementation of the read DDS buffer is depicted in the block diagram of FIG. 13. Byte-wide data from the deserializer is latched into the read DDS buffer by a "byte strobe" signal on line 160 received from the deserializer. This line is a divide-by-8 of the phase lock loop (PLL) generated bit clock synchronized by the sync bit decoder 138. Data will normally enter the read DDS buffer 154 at a 333 ns rate, with the exception for two missing cycles every RDS. The maximum frequency of the PLL (in and out of lock case) is 5.4 MHz, and this rate corresponds to a 317 ns byte rate. The maximum input rate to the read DDS buffer is thus 317 ns. A control block 162 of the read DDS buffer is a synchronized state machine clocked by the 24 MHz write clock. It performs the following functions:

1. Monitors requests for reads and writes.

2. Arbitrates read/write requests (write occurs first).

3. Generates control lines to RAM and address multiplexer.

4. Monitors buffer for full/empty.

5. Flags buffer for overflow.

The control block 162 appends memory cycles adjacent to each other if data can be supplied or received at adequate rates. This achieves a maximum data rate to or from a RAM 164 of 8 Megabytes. The minimum required data rate for a 3-Mbyte throughput is a 6-Mbyte RAM input/output rate. The 8-Mbyte rate can be expected due to the fact that the decision concerning if data can be released from the read DDS buffer 154 is made on a 32-Byte basis. Table 4 identifies the input-/output lines of the read buffer circuit 154 of FIG. 13.

TABLE 4

| INPUT/OUTPUT (I/O) SIGNALS OF READ DDS BUFFER | |
|---|---|
| I/O Lines: (Into Read DDS Buffer from Deserializer) | |
| DIN | 8 TTL signals corresponding to data byte received from the media. |
| BYTE STROBE | TTL signal indicating valid data is on DIN lines. |
| I/O Lines: (Into Read DDS Buffer from Read DDS UP) | |
| RD CNTR LIMIT | 12 TTL signals corresponding to maximum RAM address which can be shifted out of Read DDS Buffer. |
| STOP INGATING | TTL signal used to stop data from being input to Read DDS Buffer. This occurs when a defect is detected and the write counter must be updated. |
| I/O Lines: (Into Read DDS Buffer from Data Buffer) | |
| WORD STROBE | TTL signal indicating the data word on DOUT has been accepted. |
| I/O Lines: (Read DDS Buffer to Data Buffer and ECC Syndrome Gen) | |
| DOUT | 16 TTL signals corresponding to two data bytes from media. |
| WORD READY | TTL signal indicating valid data is on DOUT lines. |

Figure 14:
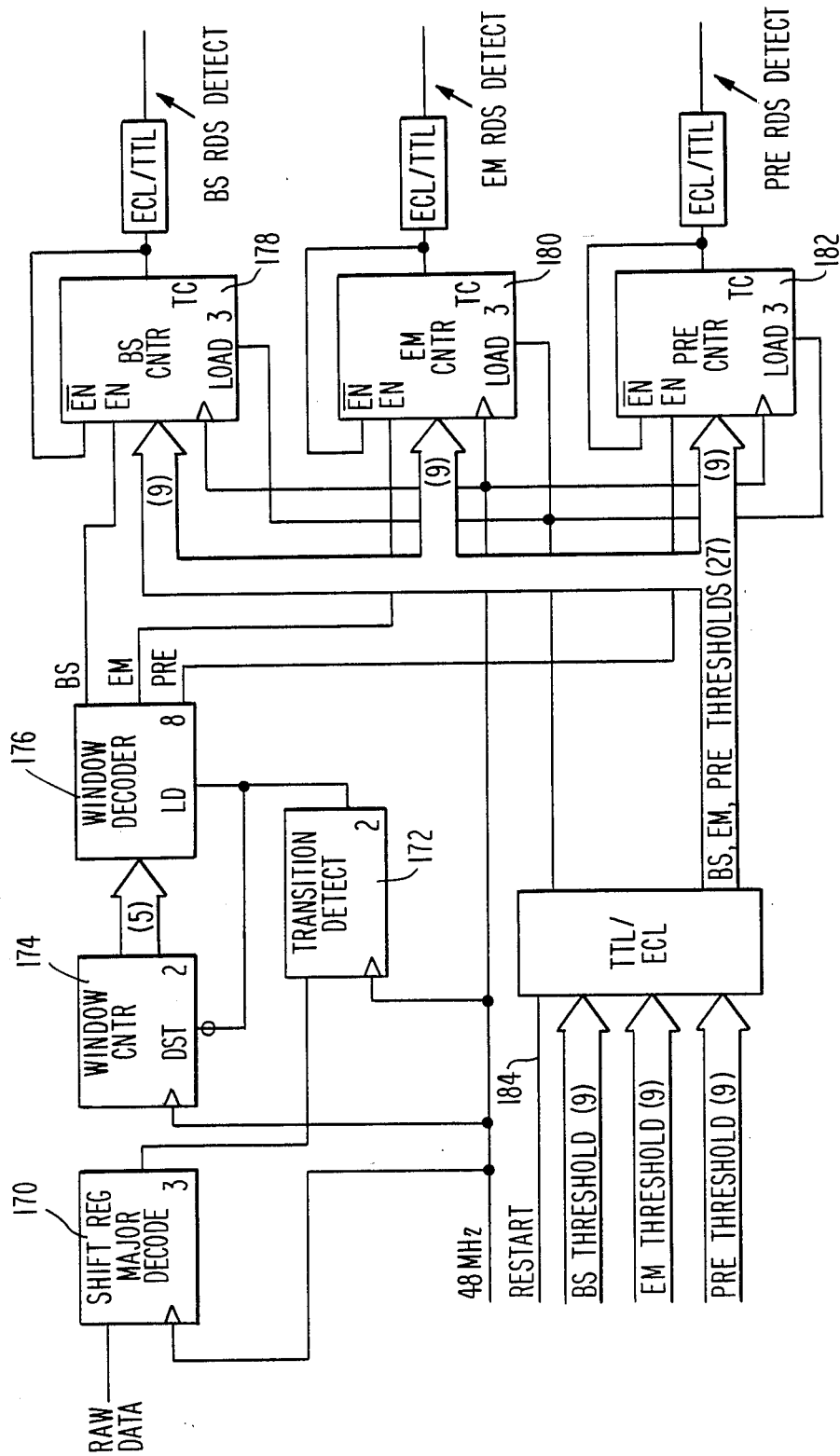
FIG. 14 is a block diagram of the BS/EM/preamble decoder of FIG. 12.

As has been described previously, certain special conditions (such as the start of a block, platter defects, etc.) are indicated on the platter by writing two unique frequencies. The block separator (BS) sector is a 1.5 MHz square wave. The exception mark (EM) sector is a 2.0 MHz square wave. These frequencies are outside the range of data. (Data frequencies range from 3 MHz to 8 MHz.) A third special function frequency, the preamble, is used to synchronize the PLL and thus is the highest frequency recorded (8 MHz). The preamble resides in the data range. These frequencies are written in burst and in a integral number of RDS's in length. In order to detect the presence of these special conditions as indicated by these frequencies, the Block Separator-/Exception Mark/Preamble Decoder circuit 135 is employed. A block diagram of this special decoder circuit is shown in FIG. 14.

The requirements of the Decoder Circuit 135 (referred as the BS/EM/Preamble decoder in the FIGURES.) may be summarized as follows:

1. To reliably discriminate the special frequencies associated with the block separator, exception mark, and preamble from each other and from the data.

2. To determine while writing if the special frequency being written will be able to be decoded for the life of the media.

3. To provide a method of setting the detection threshold. This allows some level of defects to be tolerated during a write (to allow imperfect media to be used) and a greater level of defects to be tolerated during read (to compensate for aging the media). During error recovery, repeated attempts at different thresholds can be used to recover otherwise unreadable data.

4. To ensure that incorrect decoding is extremely unlikely. That is, the ECC scheme cannot correct dynamic defect skipping failures. Thus, the marking system used (exception marks) to indicate that an incorrect write has occurred must be very reliable.

Referring to FIG. 14, prior to PLL synchronization, data enters a shift register 170 clocked by the 48 MHz system clock. The data is synchronized to the clock and a 2-3 majority decode is performed. The majority decoder 170 filters noise from the data. This filtered data is monitored for transitions in a transition detector 172. Each transition resets a window counter 174. The window counter 174, also clocked by the 48 MHz system clock, generates timing windows in which the next transition can be expected if one of the special frequencies is received. The next transition, if it occurs inside one of the windows, causes a latch corresponding to that condition to be set. This latch, identified as the window decoder 176 in FIG. 14, enables a counter corresponding to the condition to increment. Three such counters are employed: a block separator counter 178, an exception mark counter 180, and a preamble counter 182. A transition outside of the windows or no transition before the end of the longest window causes the window decoder 176 to be reset, and this action disables the respective counter. If one of the three special frequencies occurs for a long enough interval, the counter corresponding to that frequency reaches its maximum value. The counter latches in this state until the counter is preset by a restart line 184. The variable threshold requirement is implemented by allowing microcode or software to control the value to which each value is preset to when the restart line is pulsed. The restart line needs to be pulsed at the beginning of each resynchronizable data section. While searching for the start of a block, a signal is derived from the coarse seek band modulation (see patent application Ser. No. 472,436, filed Mar. 7, 1983 now abandoned).

While reading, this signal is derived from a counter clocked by the 48 MHz system clock and synchronized by the sync byte decoder. The input/output lines to the BS/EM/Preamble Decoder 135 are summarized in Table 5.

Figure 15:
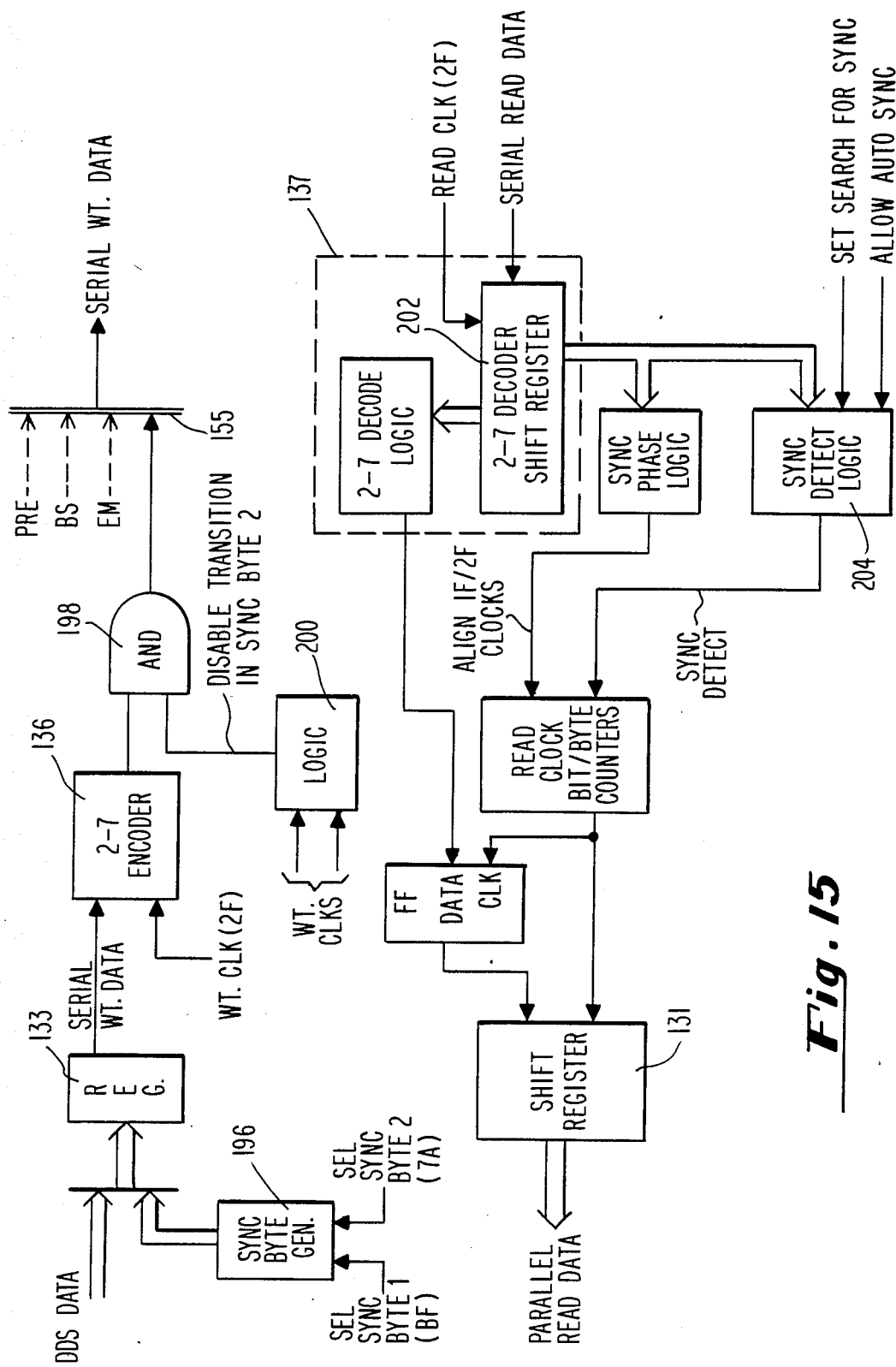
FIG. 15 is a block diagram of the sync byte generator and selected circuitry used to generate and detect the sync byte in FIG. 8.

Referring next to FIG. 15, a block diagram of the sync byte generation and detection circuitry is shown. Many of the elements shown in FIG. 15 are also found in FIG. 11, but the particular arrangement of the elements in FIG. 11 helps clarify the function performed. Parallel write data from the DDS Buffer 150 (FIG. 11) is directed to a serializer register 133. A Sync byte generator 196 selectively intersperses the sync word "BF7A" with the data in the serializer 133. The serial data from the serializer 133 is sent to the 2-7 Encoder 136 where it is encoded according to the pattern shown in Table 1. This data is then gated through an AND gate 198, the output of which is coupled to a serial write data bus 155. Logic circuitry 200 determines when the particular transition (bit) of the unchanged sync word is present (see FIG. 8) so that this bit may be surpressed, thereby generating the desired sync byte.

The sync byte is sensed by monitoring read bytes as they pass through the 2-7 decoder shift register 207. Sync byte detect logic 204 is unfigured to generate a sync detect signal whenever the prescribed sync byte bits are present. This sync detect signal is used to organize the read data into correct parallel data bytes.

TABLE 5

| INPUT/OUTPUT (I/O) SIGNALS OF BS/EM/ PREAMBLE DECODER | |
|---|---|
| I/O Lines (into Decoder) | |
| RAW DATA | ECL signal corresponding to signals read from media. |
| 48 MHz | ECl signal derived from system crystal clock. |
| RESTART | TTL signal corresponding to start of each RDS. |
| BS THRESHOLD | 9 TTL signals corresponding to desired BS threshold. |
| EM THRESHOLD | 9 TTL signals corresponding to desired EM threshold. |
| PRE THRESHOLD | 9 TTL signals corresponding to desired preamble threshold. |
| I/O Lines (From Decoder) | |
| BS DETECT | TTL signal indicating a block separator RDS has been detected. |
| EM DETECT | TTL signal indicating an exception mark RDS has been detected. |
| PRE DETECT | TTL signal indicating a preamble RDS has been detected. |

Advantageously, by organizing the data into resynchronizable data sections, which sections allow the clocking signal to be resynchronized every 32 bytes, the propogation of errors through the data due to an unsynchronized clock signal is limited. This further reduces the number of errors that can occur when data is being read from the platter.

While the invention herein disclosed has been described by means of specific embodiments and applications thereof, numerous modifications and variations could be made thereto by those skilled in the art without departing from the spirit and scope of the present invention. It is therefore to be understood that within the scope of the appended claims, the invention may be practiced otherwise than as specifically described herein.

What is claimed is:

1. A storage disk with a block format for organizing data written thereon, said storage disk having a multiplicity of concentric data tracks located thereon on which data may be stored, said block format comprising a plurality of contiguous data blocks of a selected, fixed length, each said block including a selected sequence of sectors including a plurality of resynchronizable sectors each of which have means for limiting a propagation of errors through the data written on said disk, said limiting means including a means for resynchronizing a clocking signal for said storage disk within predefined intervals of the data written on said disk, said resynchronizing means comprising two sync bytes in each said resynchronizable sector, each said sector having a selected one of a plurality of signal types written therein.

2. The storage disk of claim 1 wherein said signal types which may be written into said sectors comprise:
  a first signal type comprising a first frequency signal;
  a second signal type comprising a second frequency signal;
  a third signal type comprising a third frequency signal; and
  a fourth signal type comprising a prescribed sequence of synchronizing data bits followed by selected data.

3. The storage disk 2 of claim 2 wherein the selected sequence of a correctly written data block on said disk comprises:
  a first block separator sector having the first signal type written therein;
  a plurality of preamble sectors, each having the second signal type written therein;
  a multiplicity of resynchronizable data sectors, each having a selected fourth signal type written therein;
  a postamble sector having the second signal type written therein; and
  a second block separator sector having the first signal type written therein.

4. The storage disk of claim 3 wherein a plurality of said resynchronizable data sectors have error correcting code information included within the selected data written therein.

5. The storage disk of claim 4 wherein each of said resynchronizable data sectors has written therein a plurality of synchronization data bytes followed by at least 32 selected data bytes.

6. The storage disk of claim 3 wherein a specified sequence of said sectors identifies an incorrectly written data sector.

7. A method of organizing data that is to be written on a storage disk having a multiplicity of concentric data tracks, said method comprising the steps of:
  (a) dividing each data track into a multiplicity of equal length sectors, the sector boundaries being appropriately marked;
  (b) grouping the data to be written on the disk into data blocks, each data block comprising a selected sequence of sections, each said section being adapted to be written within the boundaries of one of said sectors;
  (c) inserting, within predefined intervals of said data, specified synchronization bytes at the beginning of selected sections; and
  (d) writing a block of data on the disk such that the block begins and ends on a sector boundary.

8. The method of claim 7 further including writing a first prescribed frequency signal in a data section to flag incorrectly written data residing in a prior data section of the same block.

9. The method of claim 7 further including writing a second prescribed frequency signal in the two data sections adjacent to the data section containing the first prescribed frequency when flagging incorrectly written data, one of said data sections containing the second prescribed frequency signal being adjacent to the section containing the incorrectly written data.

* * * * *

UNITED STATES PATENT AND TRADEMARK OFFICE
CERTIFICATE OF CORRECTION

PATENT NO. : 4,791,622

DATED : December 13, 1988

INVENTOR(S) : Clay et al.

It is certified that error appears in the above-identified patent and that said Letters Patent is hereby corrected as shown below:

Column 23, line 29, please delete the first occurrence of "2".

Signed and Sealed this

Ninth Day of May, 1989

Attest:

DONALD J. QUIGG

Attesting Officer

Commissioner of Patents and Trademarks